United States Patent [19]

East et al.

[11] Patent Number: 5,316,235
[45] Date of Patent: May 31, 1994

[54] TAPE CARTRIDGE WITH MOUNT PLATE

[75] Inventors: Don G. East; Steven L. Felde; Paul Y. Hu; Guillermo S. Robles, all of Tucson, Ariz.

[73] Assignee: International Business Machines Corporation, Armonk, N.Y.

[21] Appl. No.: 902,093

[22] Filed: Jun. 22, 1992

[51] Int. Cl.⁵ .......................................... G11B 23/087
[52] U.S. Cl. .................................................. 242/199
[58] Field of Search ............... 242/76, 192, 197, 198, 242/199, 200; 360/130.21, 132; 226/196

[56] References Cited

U.S. PATENT DOCUMENTS

| | | | |
|---|---|---|---|
| 2,612,565 | 9/1952 | Heller | 242/198 |
| 3,348,786 | 10/1967 | Miller et al. | 242/200 |
| 3,432,111 | 3/1969 | Ryder | 242/199 |
| 3,609,021 | 9/1971 | Gill | 242/199 X |
| 3,686,470 | 8/1972 | Stahlberg et al. | 179/100 |
| 3,871,755 | 3/1975 | Wright | 242/199 X |
| 4,097,006 | 6/1978 | Suito | 242/199 |
| 4,466,582 | 8/1984 | Shiba | 226/196 X |
| 4,484,719 | 11/1984 | Schoenmakers | 242/199 |
| 4,537,367 | 8/1985 | Herrington et al. | 242/199 X |
| 4,546,936 | 10/1985 | Okamura | 242/192 |
| 4,558,387 | 12/1985 | Shiba et al. | 360/132 |
| 4,614,270 | 9/1986 | Oishi | 242/199 X |
| 4,618,903 | 10/1986 | Oishi et al. | 242/198 X |
| 4,809,928 | 3/1989 | Hoffrichter et al. | 242/199 |
| 4,863,114 | 9/1989 | Moeller et al. | 242/199 X |
| 4,989,806 | 2/1991 | Eggebeen | 242/199 |
| 5,097,374 | 3/1992 | Koizumi et al. | 242/199 X |

FOREIGN PATENT DOCUMENTS 4-134774   5/1992   Japan .................................. 360/132

OTHER PUBLICATIONS

Sony Corporation, "Proposal to Quarter-Inch Drive Standards, Inc.", Nov. 20, 1991.

Primary Examiner—Daniel P. Stodola
Assistant Examiner—John P. Darling
Attorney, Agent, or Firm—M. W. Schecter

[57] ABSTRACT

A tape cartridge having a solid metal mount plate including a plurality of surfaces thereon simultaneously machined to the same plane. Tape reels and tape guides are affixed to the mount plate, thereby ensuring precise alignment to each other. A portion of at least one of the surfaces is exposed to the outside of the tape cartridge by recesses in the tape cartridge cover. Upon seating the tape cartridge in a tape drive, guides are inserted into the recesses, thereby ensuring precise alignment of the tape to a tape head in the tape drive.

29 Claims, 16 Drawing Sheets

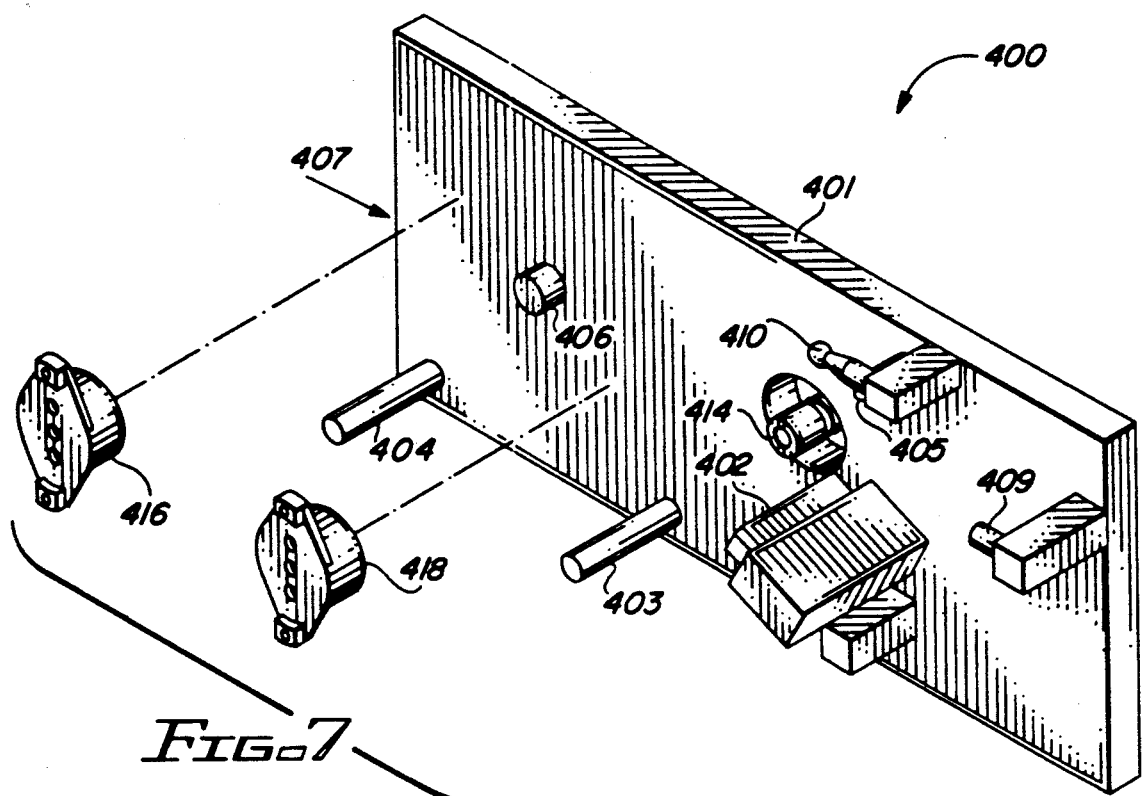
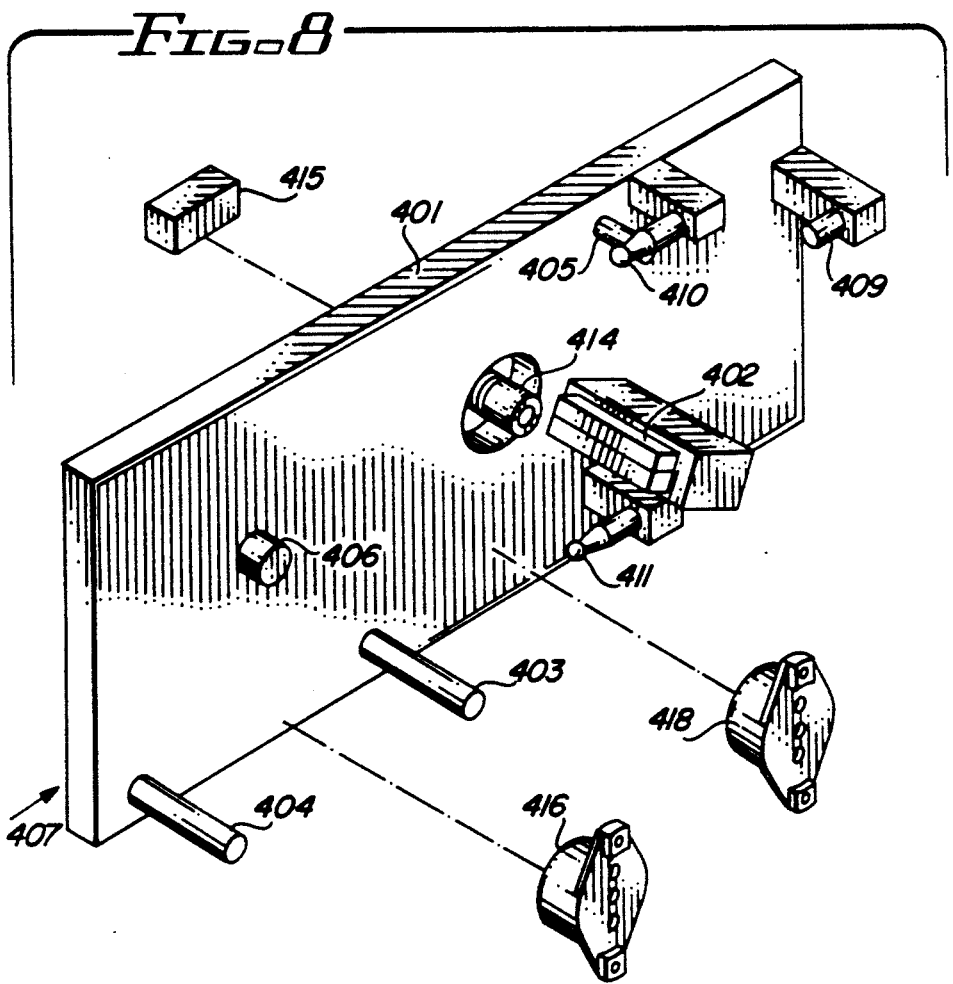

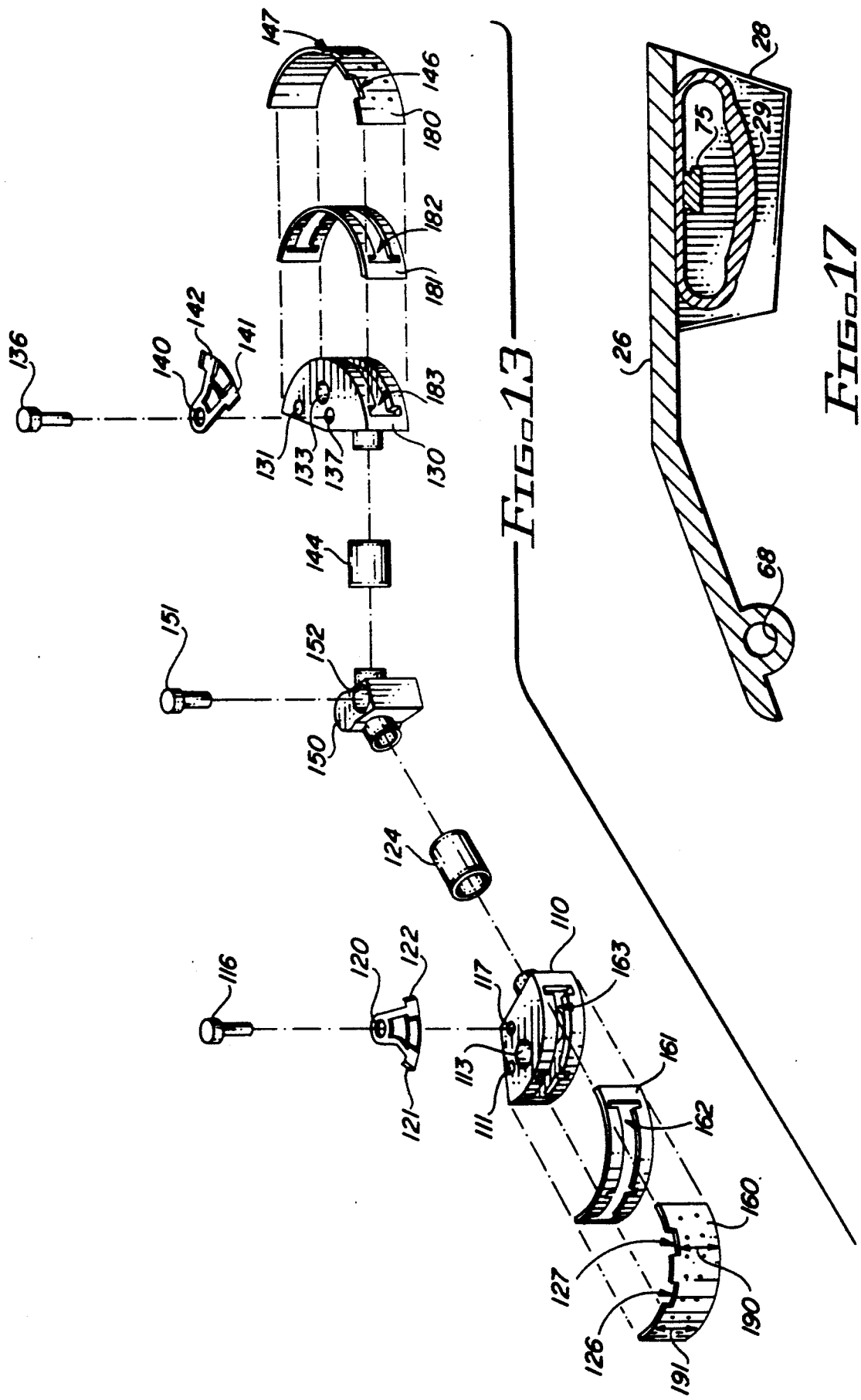

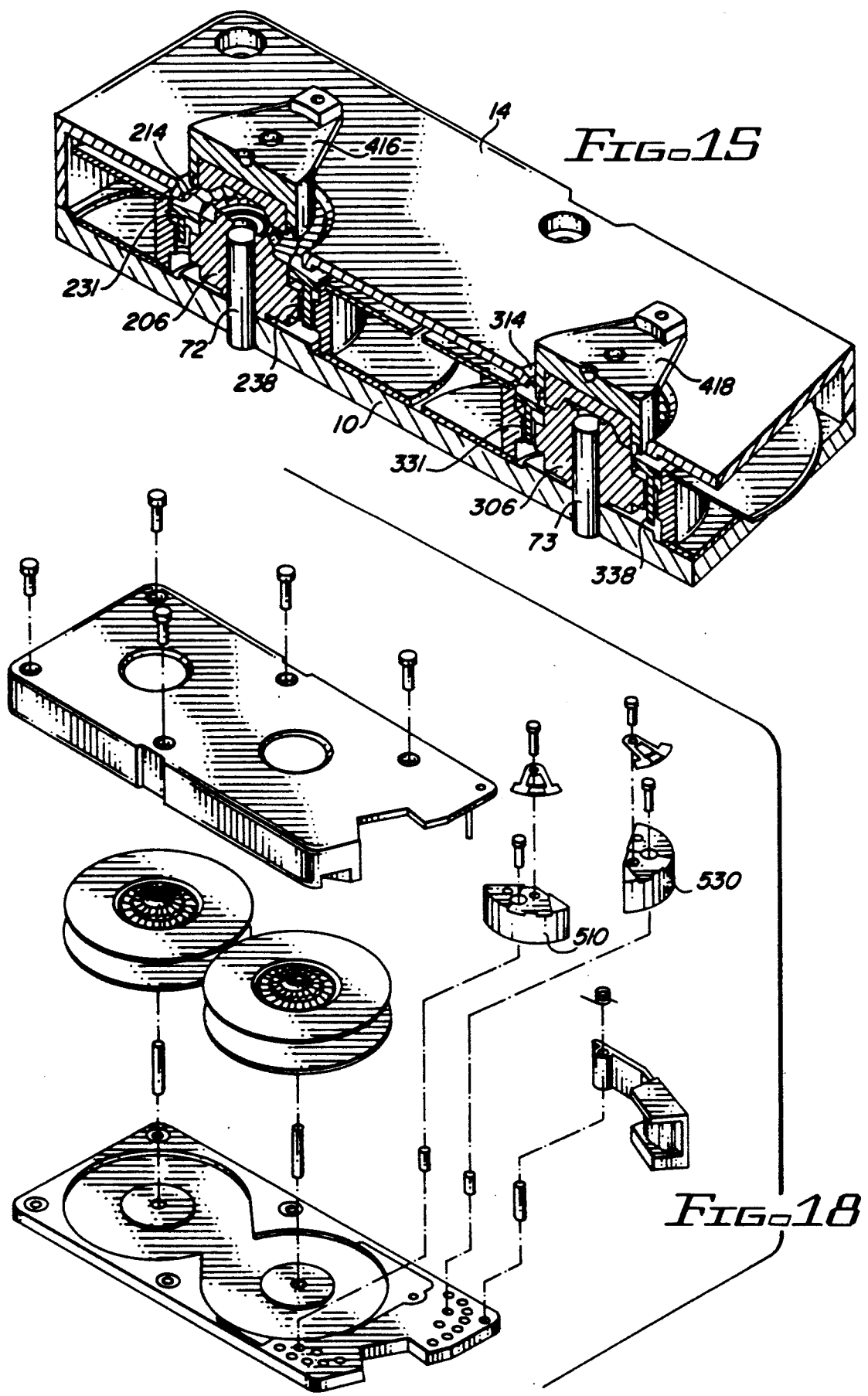

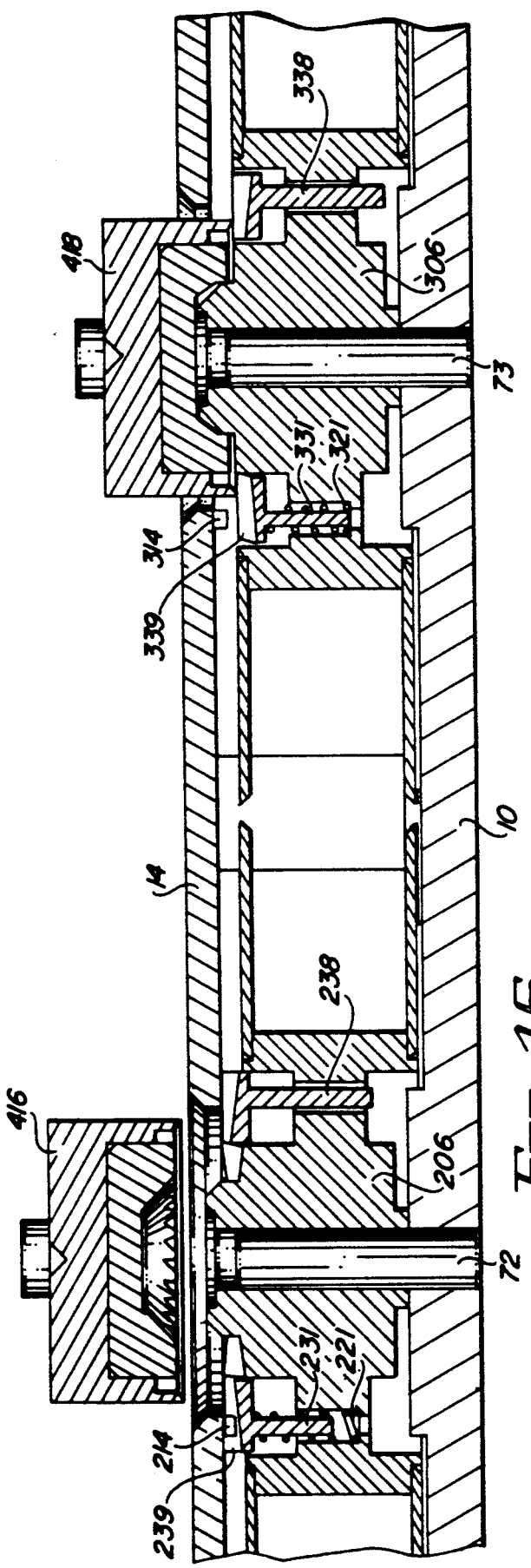
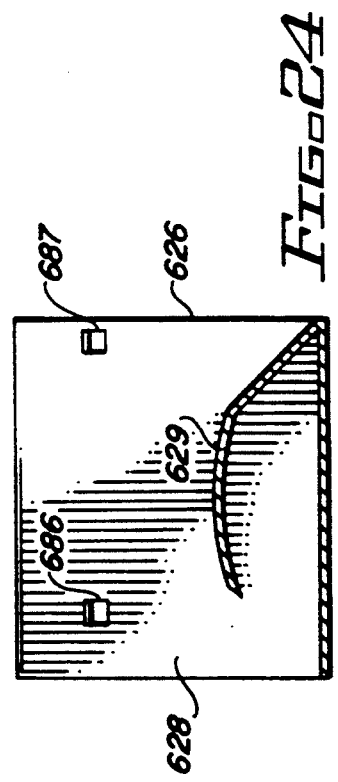

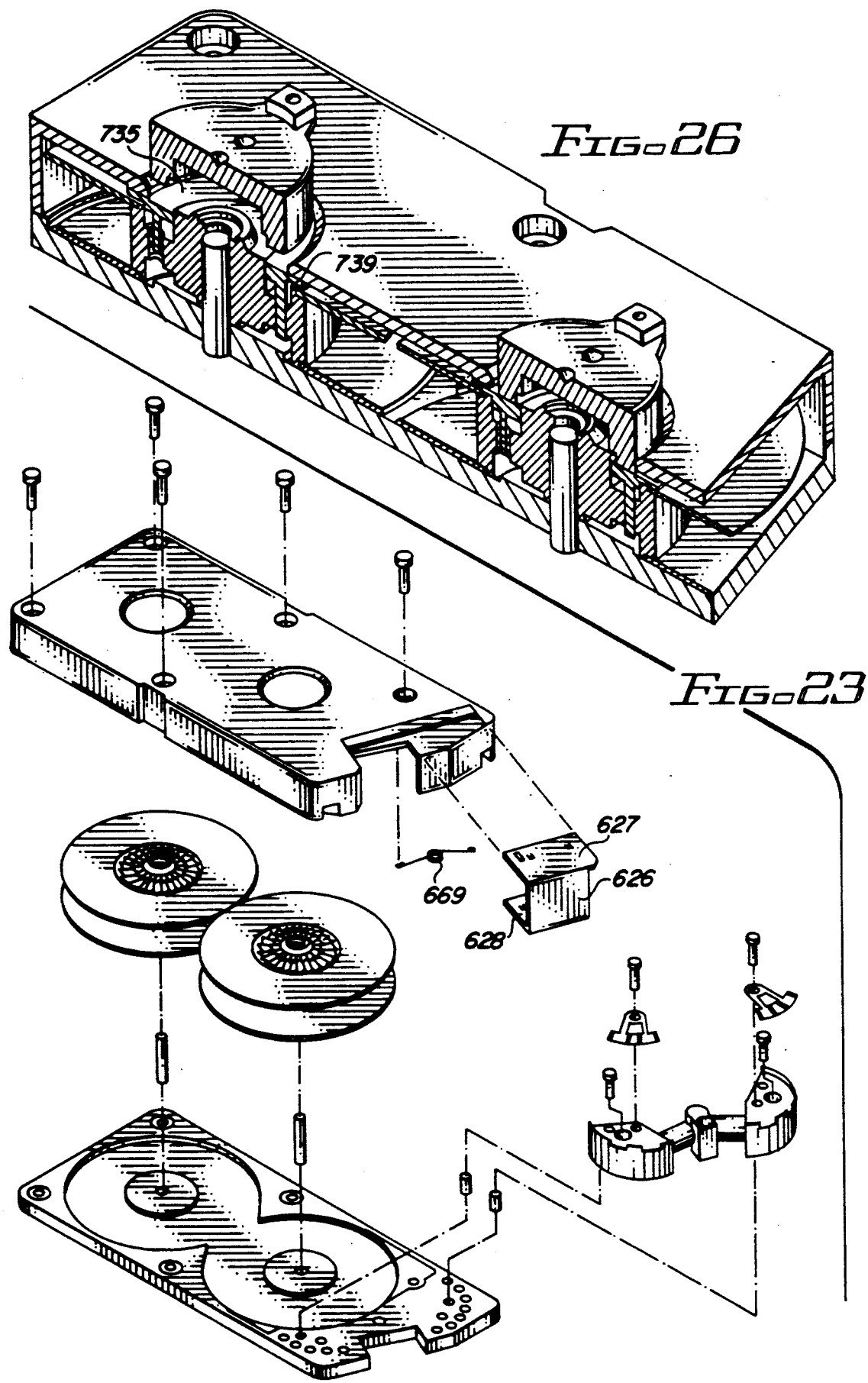

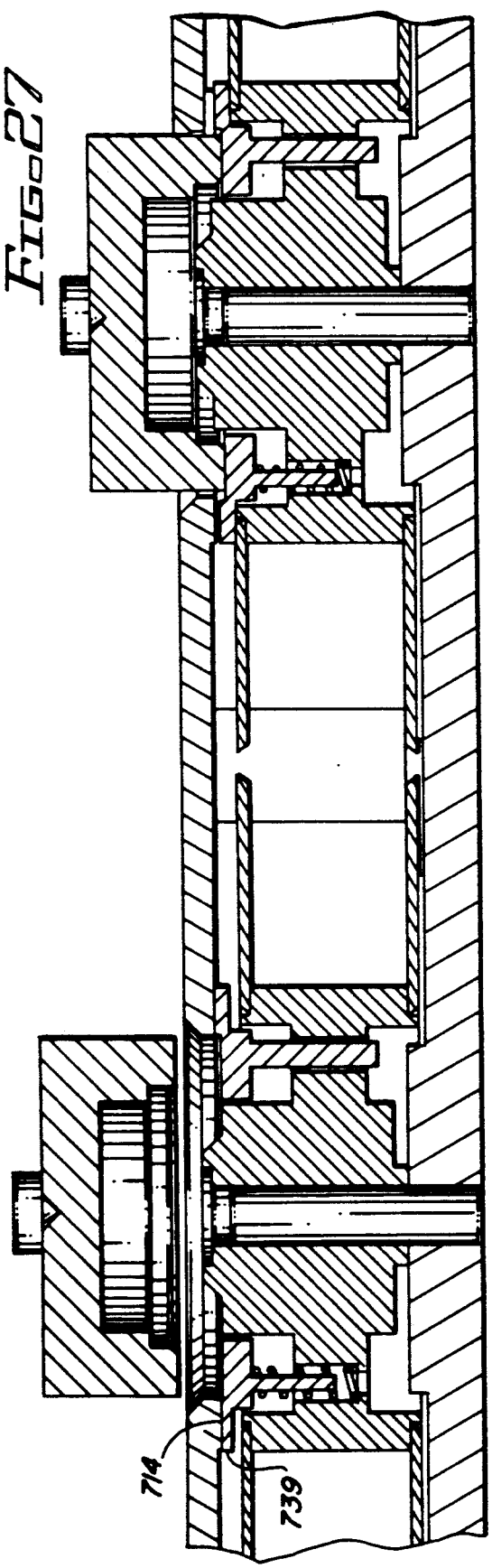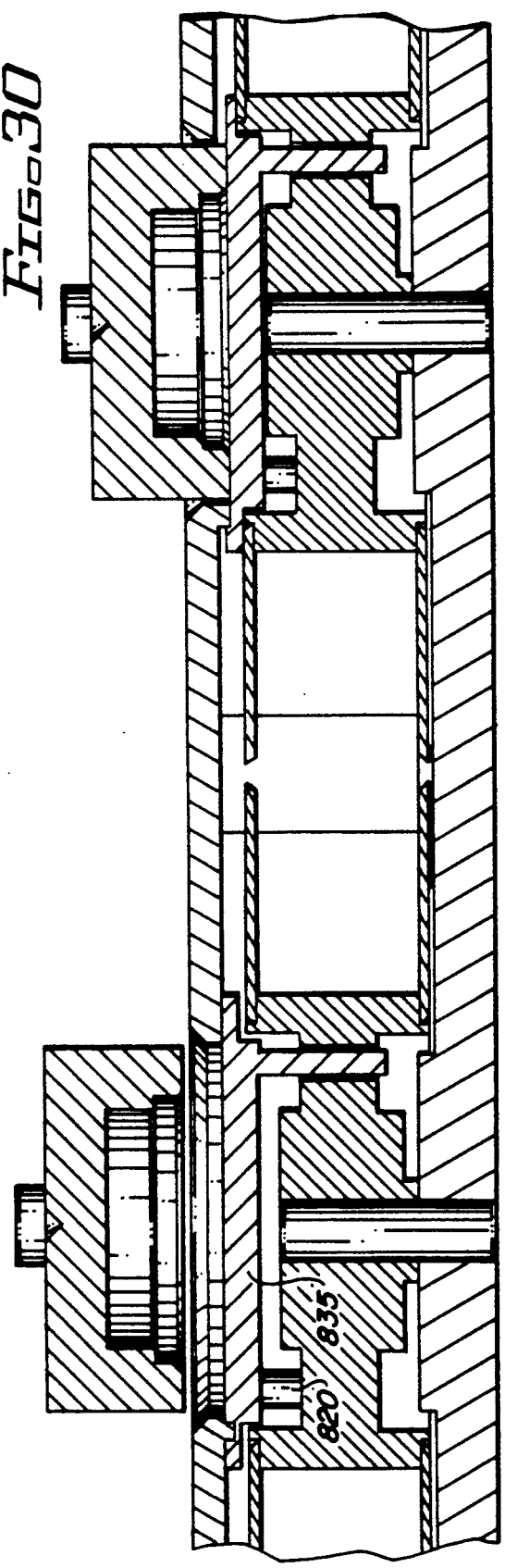

TAPE CARTRIDGE WITH MOUNT PLATE

BACKGROUND OF THE INVENTION

1. Field of the Invention

This invention relates to a tape cartridge having a mount plate. More particularly, the invention is a tape cartridge having a mount plate including a plurality of surfaces thereon machined to the same plane, a portion of which is exposed to the outside of the tape cartridge by recesses in the tape cartridge cover, to permit precise alignment of the tape reels, tape guides, and a tape head in a tape drive.

2. Description of the Related Art

Tape is a know medium for the storage of audio, video, and computer information. The information is typically written to and read from the tape magnetically and/or optically. Such tapes are available spooled on individual reels and in single or dual reel tape cassettes/cartridges. The tape in a single reel tape cartridge must be mechanically threaded through the tape path and spooled onto a take-up reel after insertion into a tape device/drive. The tape path for any type of tape cartridge and tape drive includes a tape head in close proximity to the tape and having one or more transducer elements for writing to and/or reading from the tape. The tape is driven past the tape head by a capstan, or by direct drive of the tape reels. As used herein, the terms "cassette" and "cartridge", and the terms "device" and "drive" are interchangeable.

For reliable operation of a tape drive, a tape cartridge and the tape therein must be capable of being accurately aligned to one or more tape heads in the tape drive. Known tape cartridges have shells (i.e. outer materials) manufactured from plastic or other materials which deform easily from mechanical and/or thermal stress. Such stresses may occur during the storage, manual handling, and automated handling of the tape cartridges, including the mounting and demounting of the tape cartridges in a tape drive. In addition, similar materials are used for the internal parts of known tape cartridges. Such materials make accurate alignment of the tape and tape heads difficult, and subject to alteration during aging and handling. Finally, known tape cartridges include various moving parts. For example, tape reels are known to be movable laterally (i.e. along the axis of rotation within a tape cartridge to permit them to be moved into and out of engagement with a tape reel brake. Such lateral movement further degrades the ability to accurately align the tape and tape heads. Thus, a heretofore unrecognized problem is the creation of a tape cartridge in which the tape therein can be accurately and repeatedly aligned with tape heads in a tape drive.

Another problem associated with tape drives and tape cartridges is that of pneumatic tape guiding. Pneumatic tape guides using air bearings to support the tape are known in various tape drives. Such tape guides are desirable for high performance tape paths. However, such tape guides use metal stock to create a precisely shaped and smoothly polished tape path. Such metal stock is expensive and must be machined or die-cast into the desired shape and contour. In addition, dual reel tape cartridges usually require tape guides in the cartridge. The use of such metal stock and complex machining increases the cost of tape cartridges, traditionally a low cost item used in large quantity. Gas bearing tape guides having a metal foil affixed to a plenum in a tape drive have been attempted, but have been unsuccessful because of the materials and manufacturing techniques employed. Thus, a heretofore unrecognized problem is the creation of a dual reel tape cartridge which includes pneumatic tape guiding for a high performance tape path while minimizing cost.

Another problem associated with tape drives and tape cartridges is that of tape edge guiding. Tape edge guiding is typically provided by locating compliant guides adjacent the bearing surface, which is slightly narrower than the tape. The tape thickness is minimized to permit the maximum amount of tape in a tape cartridge. As the tape thickness is reduced, the tape becomes more susceptible to tape vibrations resulting from the tape folding over the edge of the narrower bearing surface. Tape vibrations are reduced by providing full bearing support for the tape across its width (i.e. the tape is narrower than the supporting bearing surface). Compliant members are again located adjacent the bearing surface to maintain the tape thereover. When the tape temporarily wanders off of the bearing surface, and before the tape is guided back thereover, the edge of the tape is unsupported by the bearing surface. Such lack of support again renders the edge of very thin tapes susceptible to vibrations which can propagate along the tape and eventually disrupt the head-tape interface. Compliant guides fitted within recesses in thick bearing surfaces in a tape drive to provide additional tape edge support are known, but are not practical for use in a tape cartridge. Thus, a heretofore unrecognized problem is the elimination of tape vibration resulting from a lack of tape edge support during edge guiding.

Another problem associated with tape drives and tape cartridges is that of contamination. Dust, wear particles and other contaminants can cause signal dropout and the abrasion of moving parts and thus degrade performance of a tape drive and/or tape cartridge. The cleaning of tape drives and tape cartridges using various mechanical and chemical techniques is known. However, the high performance tape drives of the future will not be able to tolerate the levels of contamination found in current tape drives, before or after such cleaning.

Tape cartridges are particularly susceptible to contamination when removed from a tape drive. Dust, wear particles and other contaminants that enter the interior of a tape cartridge migrate throughout the cartridge and can be transferred to a tape drive when the tape cartridge is inserted therein. Some known tape cartridges include a tape access door to reduce such contamination. The access door is opened when the tape cartridge is inserted into a tape drive to permit mating of the tape head and the tape. The access door is closed when the tape cartridge is removed from the tape drive.

Unfortunately, tape cartridges are susceptible to contamination through other openings therein. One such opening permits access to a tape reel hub for proper seating of the tape cartridge in a tape drive and/or for mating a motor driven clutch or gear to the hub for rotatably driving the hub. The clutch enters the tape cartridge opening and moves the hub laterally within the tape cartridge (i.e. depresses the hub away from the opening) to driveably mate with the hub. As previously mentioned, such movement of the hub degrades the ability to accurately align the tape and tape heads. Thus, a heretofore unrecognized problem is the creation of a tape cartridge which achieves the high performance demanded of future tape drives, including the aforementioned tape path characteristics, yet minimizes tape cartridge contamination through hub access openings.

Another problem associated with dual reel tape cartridges is that of tape tension. In such tape cartridges the tape is always threaded between the tape reels. The precise control of tape tension when a tape cartridge is mounted in a tape drive is well known. Such control includes the sensing and mechanical adjustment of tape tension by the tape drive. When a dual reel tape cartridge is removed from the tape drive, however, such control is no longer possible.

The tape tension varies as the tape moves therewithin during handling of the tape cartridge outside of the tape drive. When a dual reel tape cartridge is inserted into a tape drive the tape head is mated with the tape to press inwardly thereagainst. When the tape cartridge is removed from the tape drive, the absence of the tape head results in reduced tape tension between the tape reels (i.e. leaves slack in the tape). The slack can migrate through the tape path during handling of the tape cartridge outside of the tape drive, causing the tape to unravel from the reels and become susceptible to damage. In addition, if the tape tension increases during handling outside of the tape drive (i.e. is pulled taut straight between the tape reels or tape guides of the tape cartridge), subsequent insertion of the tape cartridge into a tape drive may result in stretching or other deformation degrades performance of the tape drive and/or tape cartridge. Thus, a heretofore unrecognized problem is the creation of a tape cartridge which maintains constant tape tension during handling of the tape cartridge outside of a tape drive.

SUMMARY OF THE INVENTION

In view of the foregoing, it is the principal object of this invention to improve tape cartridges.

Another object of this invention is a tape cartridge in which the tape therein may be precisely aligned to a tape head in a tape drive.

These and other objects of this invention are accomplished by a tape cartridge having a solid metal mount plate including a plurality of surfaces thereon simultaneously machined to the same plane. Tape reels and tape guides are affixed to the mount plate, thereby ensuring precise alignment to each other. A portion of at least one of the surfaces is exposed to the outside of the tape cartridge by recesses in the tape cartridge cover. Upon seating the tape cartridge in a tape drive, guides are inserted into the recesses, thereby ensuring precise alignment of the tape to a tape head in the tape drive.

The foregoing and other objects, features, and advantages of the invention will be apparent from the following more particular description of the preferred embodiment of the invention, as illustrated in the accompanying drawing.

BRIEF DESCRIPTION OF THE DRAWING

FIG. 7 is an isometric view of the tape cartridge mount and disengaged clutch faces which mate with the tape cartridge according to the invention.

FIG. 8 is an isometric view of the tape cartridge mount and disengaged clutch faces from an alternate perspective.

FIG. 13 is an exploded, isometric view of the pneumatic tape guide assembly.

FIG. 15 is an isometric view of a portion of the tape cartridge sectioned vertically at line AA, except for the hub axles.

FIG. 16 is a front view of a portion of the sectioned tape cartridge.

FIG. 17 is a top view of the pivoting access door with the upper flange removed.

FIG. 18 is an exploded, isometric view of the tape cartridge with a non-pneumatic tape guide assembly.

FIG. 23 is an exploded, isometric view of the tape cartridge with a sliding access door open.

FIG. 24 is a top view of the sliding access door with the upper flange removed.

FIG. 26 is an isometric view of a portion of the tape cartridge with an alternate tape reel and sectioned vertically at line AA, except for the hub axles.

FIG. 27 is a front view of a portion of the sectioned tape cartridge with an alternate tape reel.

FIG. 30 is a front view of a portion of the sectioned tape cartridge with another alternate tape reel.

DESCRIPTION OF THE PREFERRED EMBODIMENT

Figure 1:
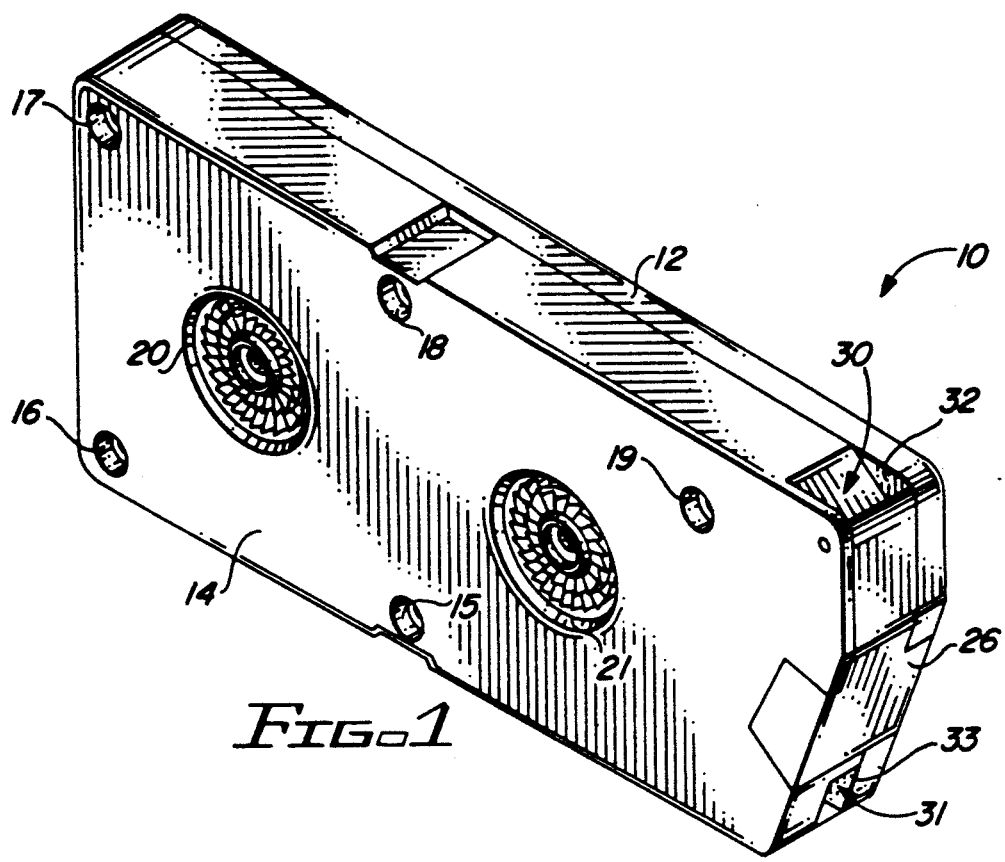
FIG. 1 is an isometric view of the tape cartridge according to the invention

Referring now more particularly to the drawing, like numerals denote like features and structural elements in the various figures. The invention will be described as embodied in a dual reel, tape cartridge.

Referring to FIG. 1, a tape cartridge 10 includes a box-like housing formed by a mount plate 12 and a cover 14. Cover 14 is secured to mount plate 12 by screws inserted through a set of holes 15-19. Cover 14 also includes two holes 20 and 21 exposing portion of two tape reels. As shown in FIG. 1, the tape reels are toothed hub tape reels. Cover 14 includes two wall recesses represented by arrows 30 and 31. Wall recesses 30 and 31 expose two mount portions 32 and 33, respectively, of the inner surface of mount plate 12. A pivoting access door 26 is hinged between mount plate 12 and cover 14 and is shown in the closed position.

Figure 2:
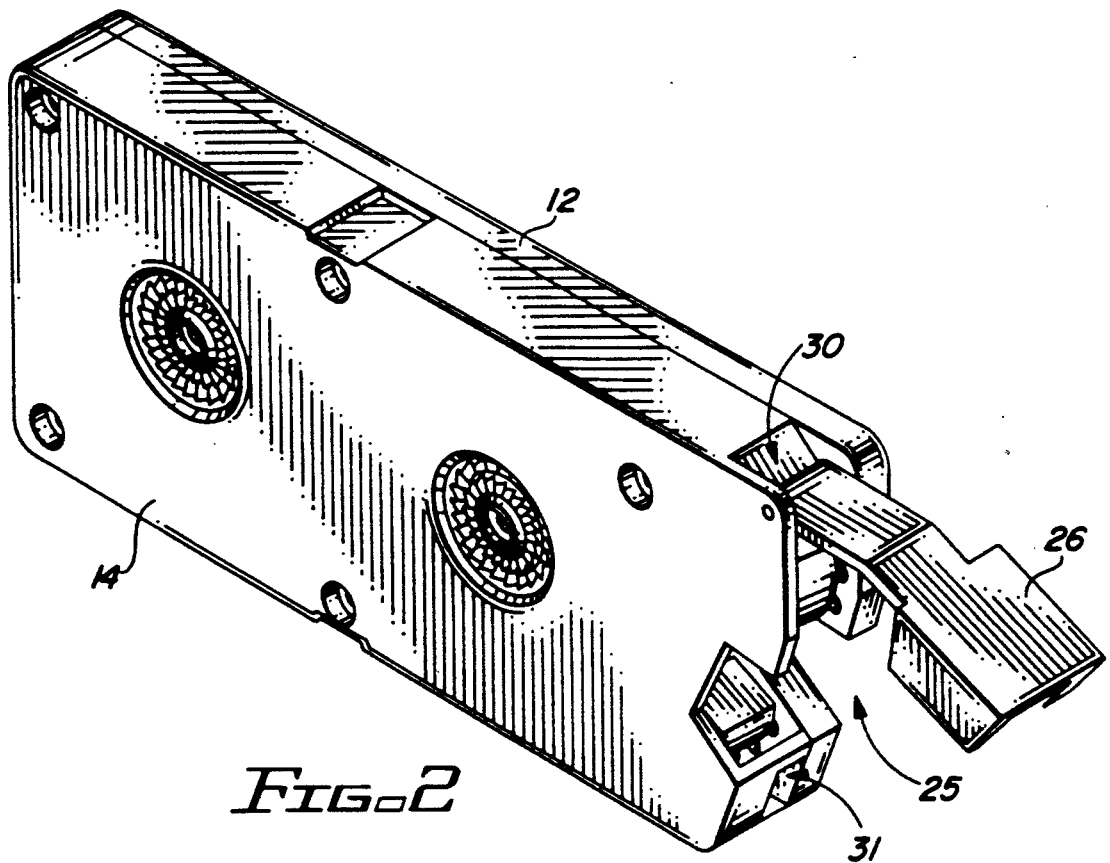
FIG. 2 is an isometric view of the tape cartridge with the pivoting access door open.

Referring to FIG. 2, tape cartridge 10 is shown with access door 26 pivoted to the open position, thereby exposing the inside of tape cartridge 10 through a head opening represented by arrow 25. The tape is not shown in FIG. 2 to permit viewing of a portion of the tape guiding path, as will be described. When access door 26 is pivoted to the open position, one or more tape heads (not shown) may be brought into contact with the tape to permit read and/or write access to data on the tape, as will be described further herein.

Figure 3:
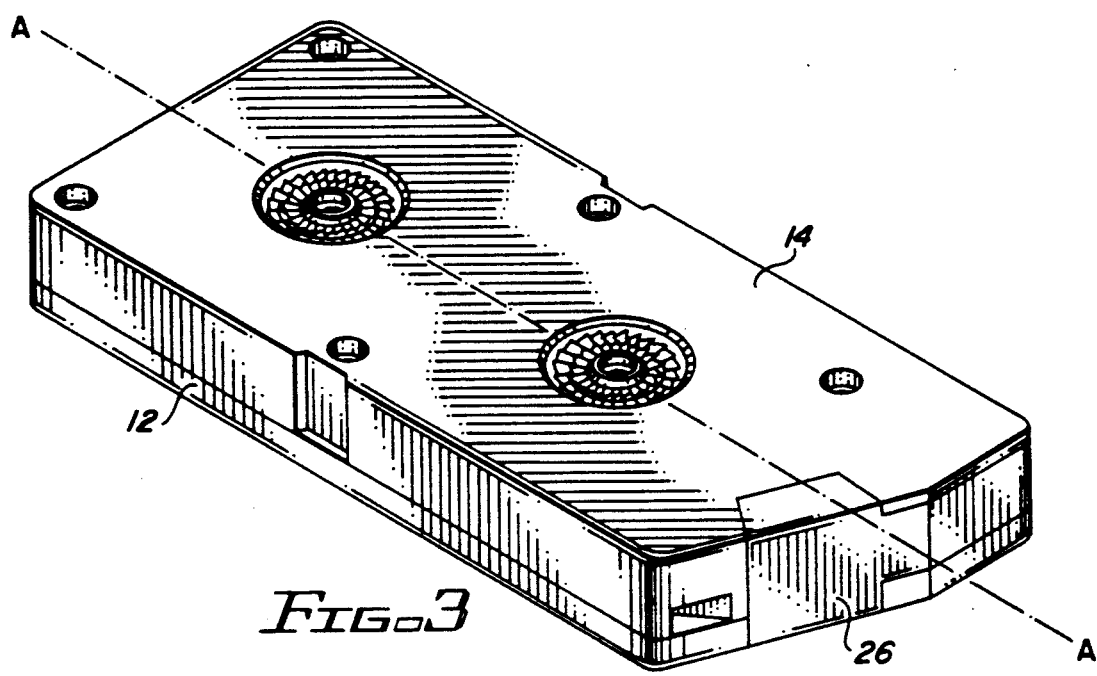
FIG. 3 is an isometric view of the tape cartridge from an alternate perspective.
Figure 4:
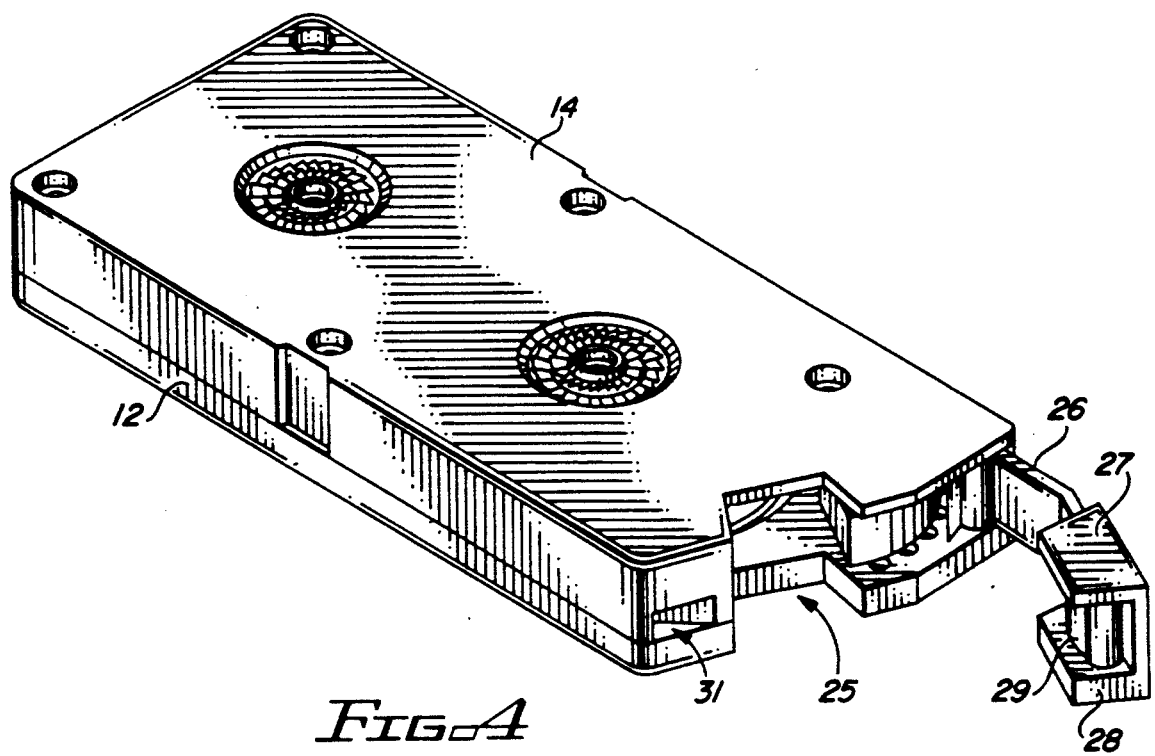
FIG. 4 is an isometric view of the tape cartridge with the pivoting access door open from the alternate perspective.

Referring to FIGS. 3-4, tape cartridge 10 is shown from an alternate perspective. The position of access door 26 in FIG. 4 reveals two door flanges 27 and 28 and a pseudo-head 29. When access door 26 is pivoted to the closed position, the tape is straddled by (i.e. travels in a path between) upper flange 27 and lower flange 28. Pseudo-head 29 protrudes inward between flanges 27 and 28. When access door 26 is pivoted to the closed position, pseudo-head 29 takes the place of the tape head in the tape path.

Figure 5:
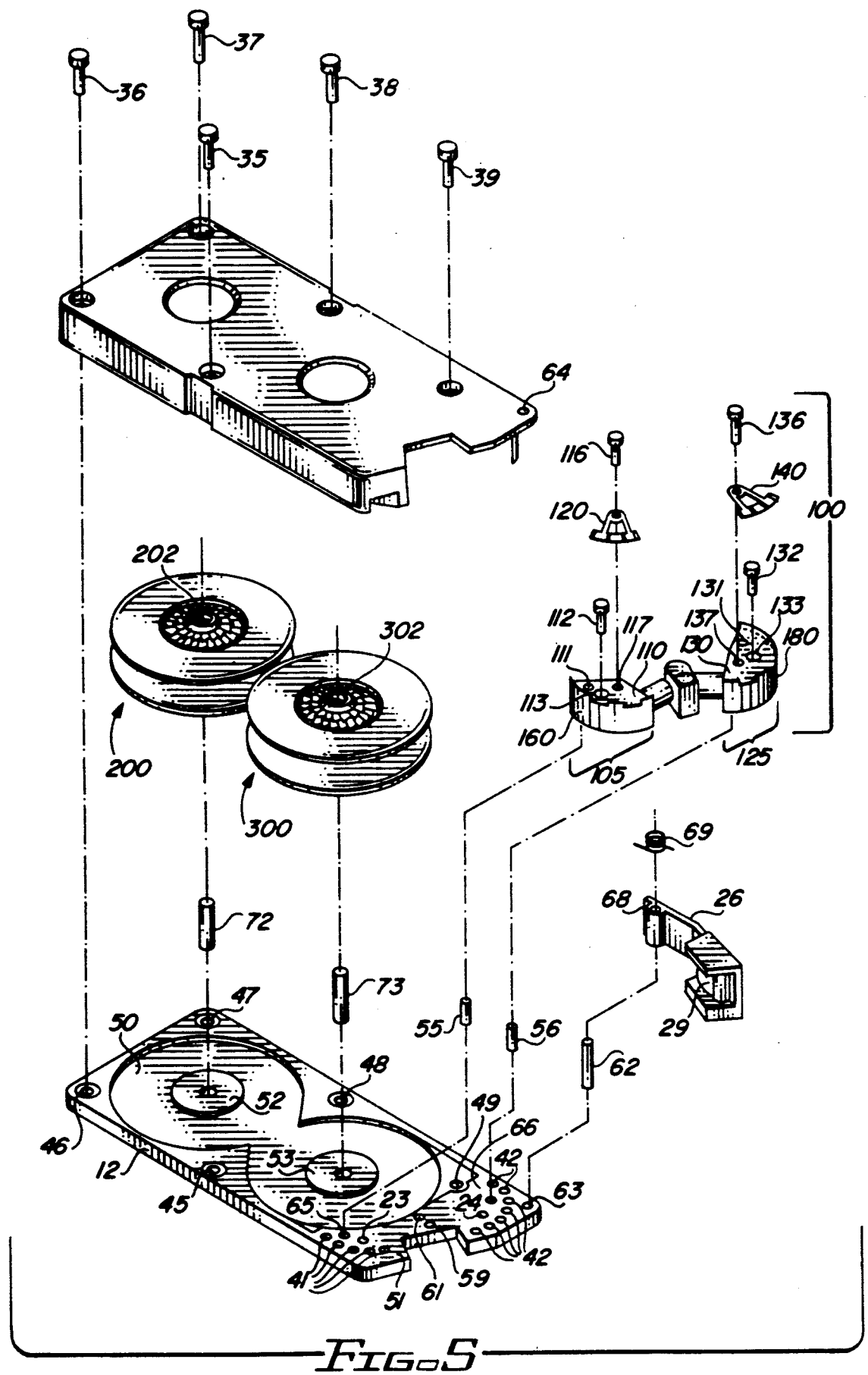
FIG. 5 is an exploded, isometric view of the tape cartridge from the alternate perspective, with the pivoting access door open.

Referring to FIG. 5, tape cartridge 10 is shown exploded to expose the inside thereof. For convenience, no tape is shown. A set of screws 35-30 are inserted through holes 15-19 and thread into a set of holes 45-49 in mount plate 12 to secure cover 14 to mount plate 12. A pin 62 secures mount plate 12 at a hole 63 to cover 14 at a hole 64. Pin 62 is inserted through hole 68 to permit pivoting of access door 26. A spring 69 biases access door 26 toward its closed position.

Mount plate 12 includes various inner surfaces. A set of inner mount surfaces 51-53 are in the same mount plane. Because mount surfaces 51-53 are in the same plane, various tape cartridge components can be precisely positioned relative to a tape cartridge mount (not shown) in a tape drive and to each other, as will be described. An inner surface 50 is recessed into the mount plane to permit the unobstructed rotation of two tape reels 200 and 300.

Several components of tape cartridge 10 or a tape cartridge mount are mounted to or interface with mount surface 51. A pneumatic tape guide assembly 100 is secured to mount surface 51. Two pins 55-56 locate assembly 100 to two holes 65-66, respectively. A hole 61 mates with the tape cartridge mount (not shown) for the passage of a gas from the tape drive including the tape cartridge mount into the pneumatic tape guide assembly 100. A set of circular recesses 41 and 42 (collectively identified for convenience) into the mount surface 51 allow gas to bleed from the edge of the tape, as it moves inside tape cartridge 10. Mount surface 51 also includes mount positions 32-33, and holes 23-24, 45-48, 59 and 63.

Two axles 72 and 73 are secured to mount surfaces 52 and 53, respectively. The hubs of two toothed hub tape reels 200 and 300 are rotatably mounted upon hub axles 72 and 73, respectively. Axles 72 and 73 extend through two hub holes 202 and 203, respectively. Tape reels 200 and 300 will be described further herein.

The pneumatic tape guide assembly 100 includes two nearly D-shaped tape guiding bearings 105 and 125. The gas bearings include two plenums (one plenum for each bearing) 110 and 130. Two thin bearing foils 160 and 180 are mounted to plenums 110 and 130, respectively, as will be described further herein. Plenums 110 and 130 include two holes 111 and 131, respectively, for mounting upon pins 55 and 56, respectively. Two screws 112 and 132 secure plenums 110 and 130, through two holes 113 and 133, to holes 23 and 24 of mount plate 12 respectively. Two screws 116 and 136 secure two compliant members 120 and 140, through two holes 117 and 137, to plenums 110 and 130 respectively. Assembly 100 will be described further herein.

Figure 6:
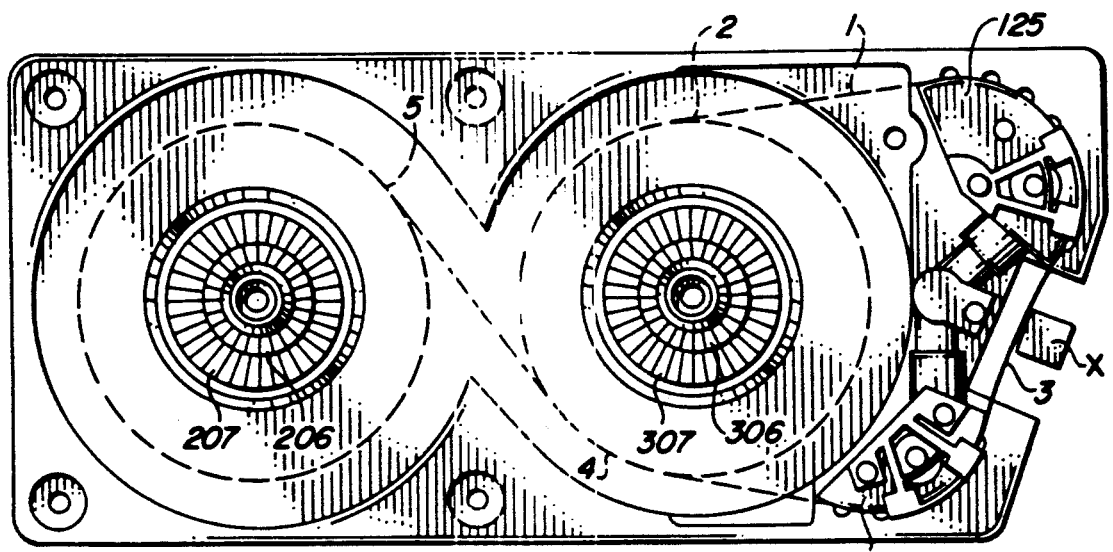
FIG. 6 is a top view of the tape cartridge with the cover and pivoting access door removed, and a tape head or pseudo-tape head inserted into the tape path.

Referring to FIG. 6, tape cartridge 10 is shown with cover 14 and, except as described hereafter with respect to pseudo-head 29, pivoting access door 26 removed. A tape 1 (dotted line) is shown wound on tape reels 200 and 300. Tape 1 may be wound from tape reel 300 to tape reel 200, or vice-versa. For the former, tape 1 exits from tape reel 300 at region 2, extends around bearing 125, through a head region 3, around bearing 105, forms a squeeze bearing 4 with tape still wound upon tape reel 300, and is spooled on to tape reel 200 at region 5. The tape path is reversed when tape 1 is wound from tape reel 200 to tape reel 300. The tape is wound by the action of a motor (not shown) in the tape drive which drives a toothed hub 206 of tape reel 200 and/or a toothed hub 306 of tape reel 300. The motor engages hubs 206 and 306 through clutches (not shown). When the clutches are disengaged from hubs 206 and 306, the rotation of hubs 206 and 306 is prevented by a toothed circular brake 207 and a toothed circular brake 307, respectively.

Squeeze bearing 4 assists in the control of vibration and entrained air. A squeeze bearing is a thin layer of a gas (such as air) used to support a solid physical element. Here squeeze bearing 4 is an "implicit" squeeze bearing in that it is formed by allowing tape 1 to come within close proximity of itself—no ancillary devices are used. In actual operation, squeeze bearing 4 does not allow tape 1 to contact itself. At normal operating velocities, a thin film of air is formed between the two surfaces of the tape. The two surfaces have identical velocities, thereby precluding wear of either surface. When tape 1 is motionless or moving at low velocities (e.g. during start ups and stoppages), the squeeze bearing collapses and the tape actually contacts itself. In either condition, the tape actually applies a force to itself. The amount of force applied depends upon the winding rates, tensions, and geometries. Squeeze bearing 4 damps tape tension variation, inhibits vibration from tape reel 200 from being transmitted along the tape to the head-tape interface at region 3, and exhausts entrained air otherwise entrapped between the wound wraps of the tape on tape reel 300.

Still referring to FIG. 6, a tape head or pseudo-head, referenced generically by the letter X, is shown mated (i.e. in contact) with tape 1 at head region 3. When tape cartridge 10 is inserted into a tape drive (not shown) and seated in the tape cartridge mount therein, as will be described, X is a tape head. Bearings 105 and 125 guide tape 1 in the proximity of the tape head while minimizing friction and wear, as will also be described. Such guiding permits the tape head to write data to, and read data from, tape 1. When tape cartridge 10 is not inserted into a tape drive, access door 26 is closed and X is pseudo-head 29.

There is curvature (bowed into tape cartridge 10) in the path of tape 1 between bearings 105 and 125, as shown in FIG. 6. Both the tape head and the pseudo-head insert into the tape path of tape 1 to prevent it from being drawn taut straight between bears 105 and 125. Note that FIG. 6 reveals the dimensions of tape 1. The dimension of tape 1 extending from one tape reel to the other is referred to as the "length", the dimension extending in and out of the figure is referred to as the "width", and the remaining dimension is referred to as the "thickness".

Referring to FIGS. 7-8, a tape cartridge mount 400 of a tape drive suitable for accessing data on tape cartridge 10 will be described. Mount 400 includes a base 401 having a tape head 402 mounted thereon. Head 402 may be any suitable for reading and writing data longitudinally along the length of a tape. For example, a thin film, interleaved, multi-track magnetic transducing head may be used. The individual data tracks may be accessed using inductive or magnetoresistive elements. The data may be recorded on the tape in any compatible format.

The seating of tape cartridge 10 in mount 400 permits the relative lateral positions of head 402 and the tape to be precisely controlled. Head 402 is wider than tape cartridge 10 and can be moved laterally (in the direction perpendicular to the surface of base 401) relative to the tape to align the transducing elements of head 402 with the data tracks on the tape. Head 402 is moved laterally by a stepper motor, voice coil motor, or other known means. The head position relative to the tape may be sensed by any known means, including a continuous servo loop. Further description of the head positioning means is not relevant to the invention.

Base 401 has several cartridge registration stops mounted thereon to direct the tape cartridge (not shown) into the seated position as it is inserted in the direction represented by arrow 407. Two stops 403 and 404 support the mass of the tape cartridge against the force of gravity. Another stop 405 prevents the tape cartridge from moving too far in the direction of arrow 407. A door stop 409 maintains pivoting access door 26 in the open position to expose the tape to head 402. Access door 26 is first pivoted to the open position by a mechanism (not shown) in the tape drive. The tape cartridge is forced against two ball-headed stops 410 and 411 at mounting portions 32 and 33, respectively, by the extension of a gas port 414. The rounded head of stops 410 and 411 direct mounting portions 32 and 33 between the stops and base 401 as the tape cartridge is seated by movement in the direction of arrow 407. Two clutch faces from the tape drive (remainder of the tape drive not shown) are not part of mount 400 and are shown positioned to permit simple movement into engagement with toothed hubs 206 and 306 to firmly seat the tape cartridge against a reference point 406.

Figure 9:
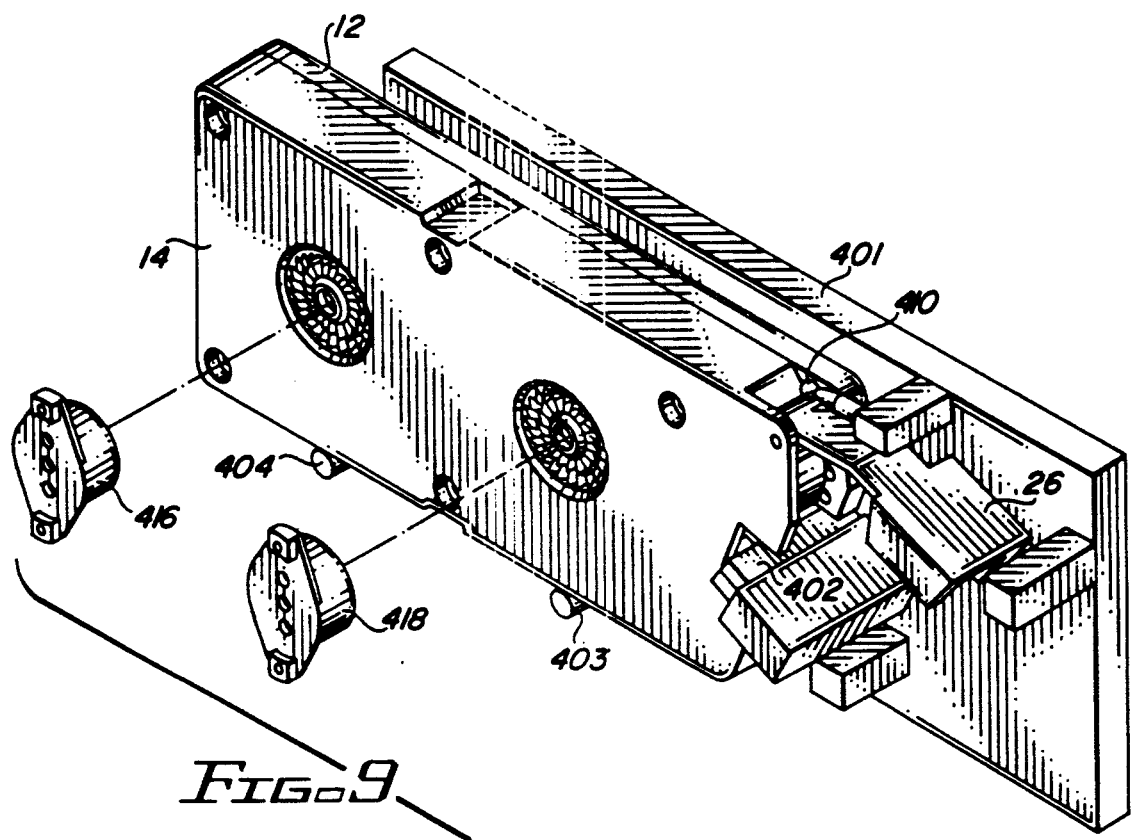
FIG. 9 is an isometric view of the tape cartridge mount with the tape cartridge inserted therein and the clutch faces disengaged.
Figure 10:
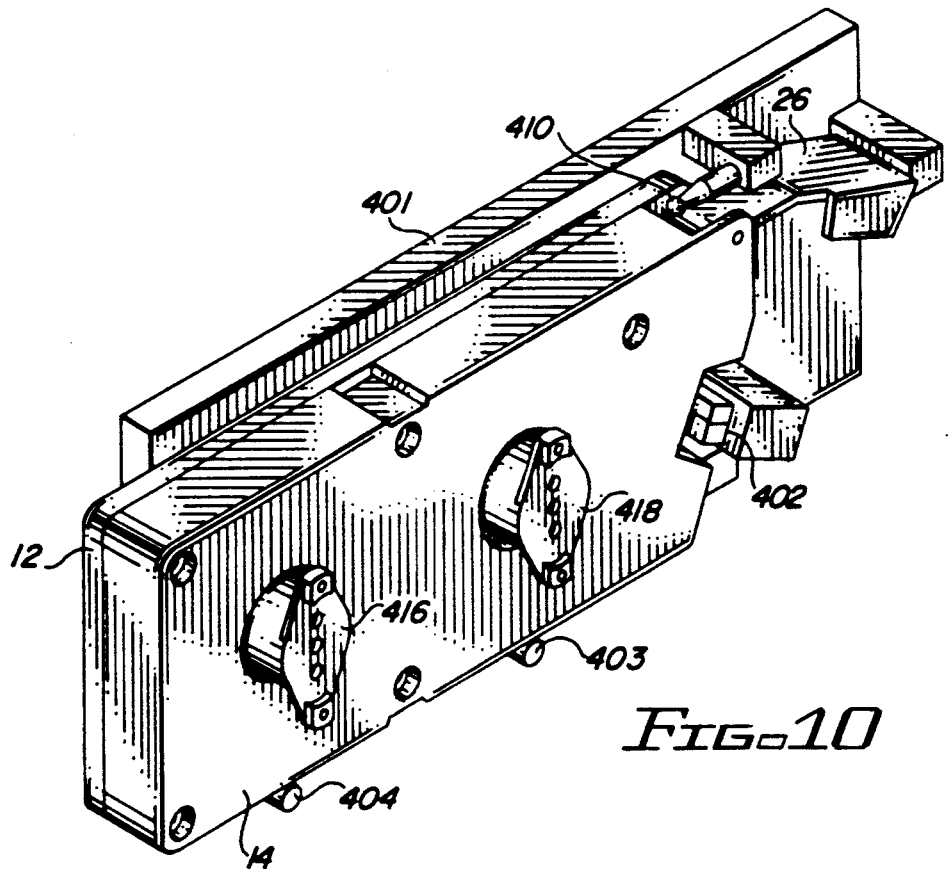
FIG. 10 is an isometric view of the tape cartridge mount with the tape cartridge inserted therein, and the clutch faces engaged, from the alternate perspective.
Figure 11:
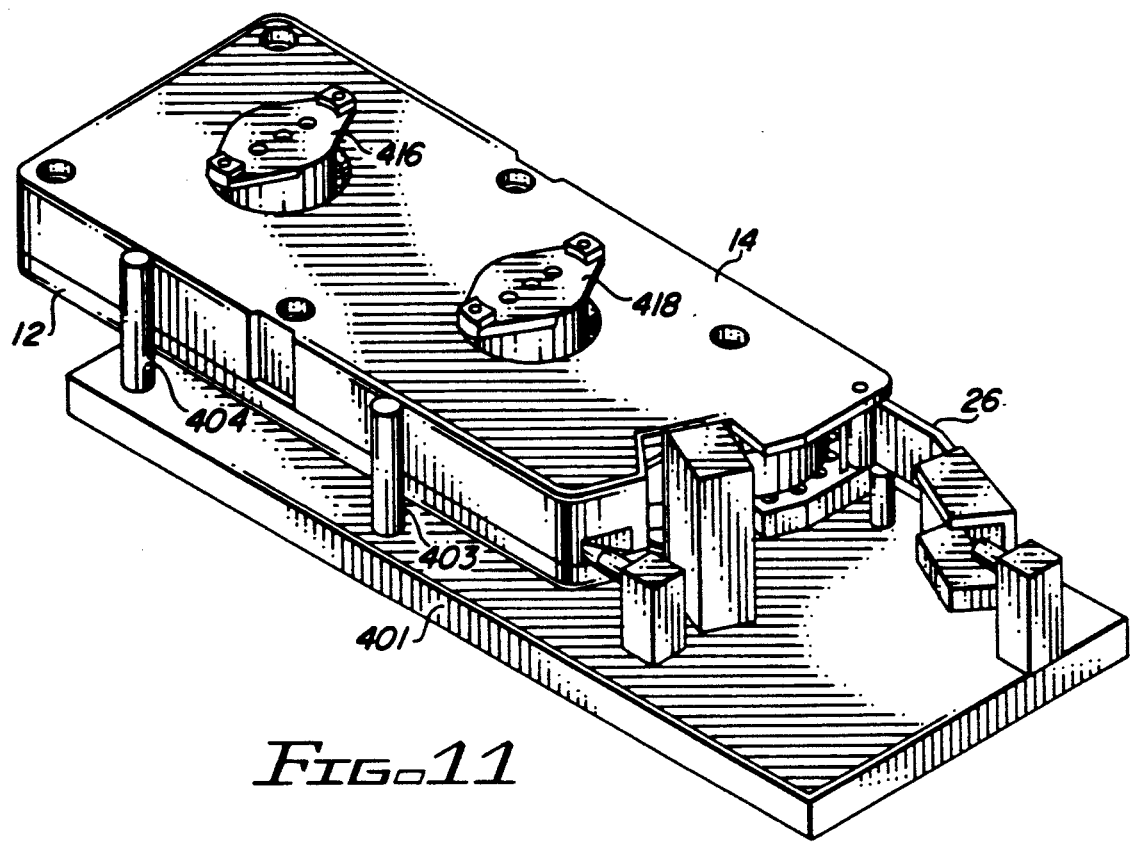
FIG. 11 is an isometric view of the tape cartridge mount with the tape cartridge inserted therein, and the clutch faces engaged, from yet another perspective.

Referring to FIGS. 9-11, tape cartridge 10 is shown seated in tape cartridge mount 400. Once again, tape 1 is not shown for convenience. Pivoting access door 26 is in the open position and tape head 402 is seated in head opening 27. The open position of access door 26 creates clearance for guide 410 to reach recess 30. Gas port 414 is in alignment with hole 61 in mount plate 12. A gas source 415 (shown only in FIG. 8) in the tape drive may then provide gas into pneumatic tape guide assembly 100 to create a pneumatic gas bearing between the tape and bearings 105 and 125. Gas source 415 may be a suitable container of compressed gas, or may be a pump providing filtered ambient air to port 414.

FIG. 9 shows clutch faces 416 and 418 disengaged from toothed hubs 206 and 306, respectively. FIGS. 10-11 show clutch faces 416 and 418 engaged with toothed hubs 206 and 306, respectively. Because tape cartridge 10 is firmly positioned in the tape drive, pins 72 and 73 are also firmly positioned. Hubs 206 and 306 thus have no radial play as they rotate about pins 72 and 73. Universal self-axially-aligning clutches are therefore used to ensure an accurate alignment of the axes of clutch faces 416 and 418 to those of hubs 206 and 306. The firm seating of tape cartridge 10 in mount 400, combined with the precise alignment of tape reels 200 and 300 and bearings 105 and 125 to mount plate 12, result in a precise alignment of tape 1 to tape head 402 capable of the highest performance.

Figure 12:
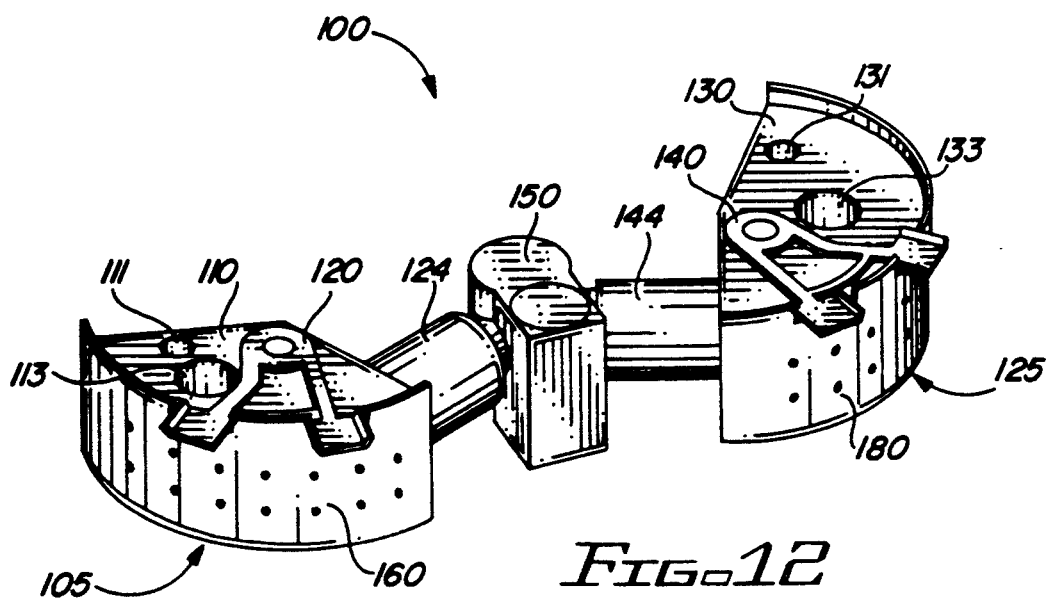
FIG. 12 is an isometric view of the pneumatic tape guide assembly of the tape cartridge.
Figure 19:
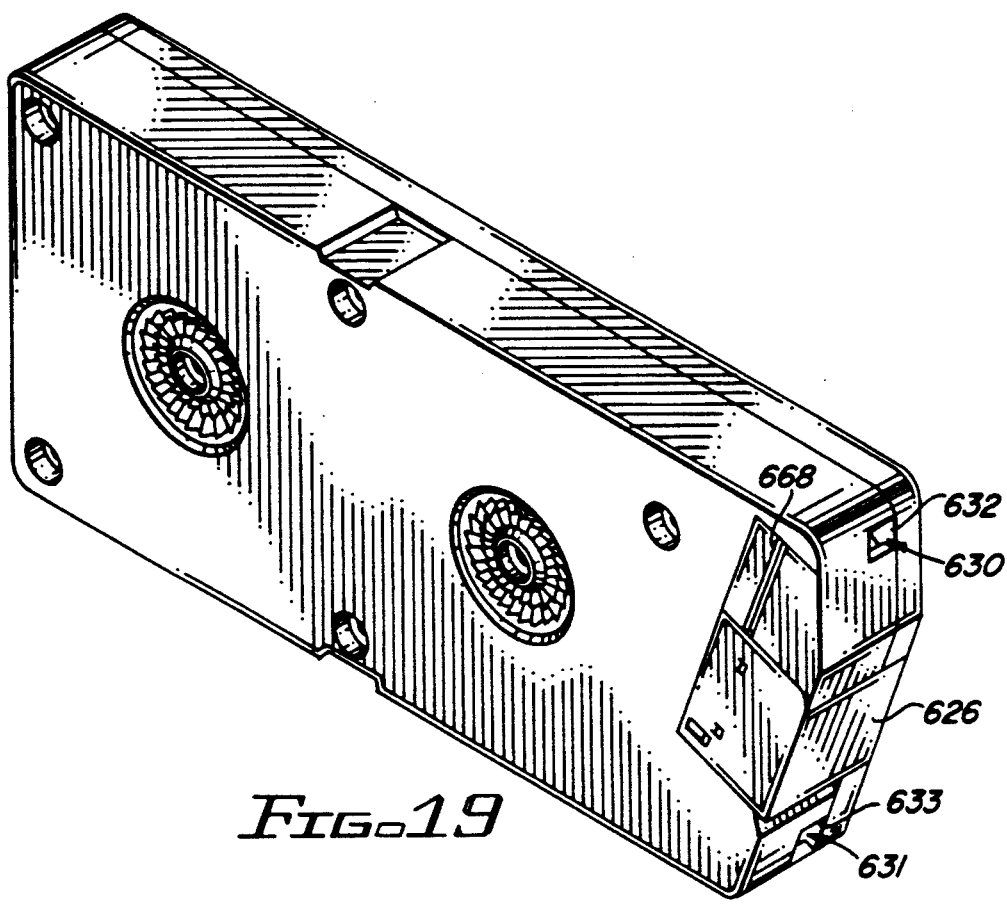
FIG. 19 is an isometric view of the tape cartridge with a sliding access door.
Figure 20:
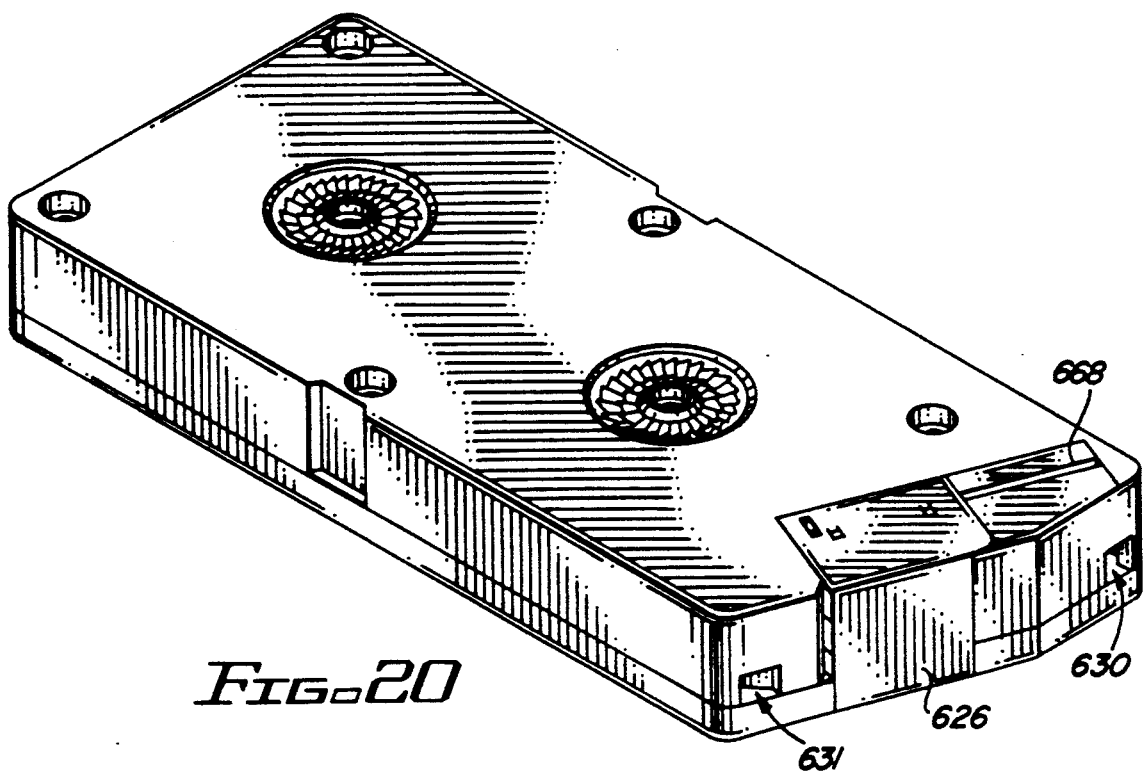
FIG. 20 is an isometric view of the tape cartridge with a sliding access door from an alternate perspective.
Figure 21:
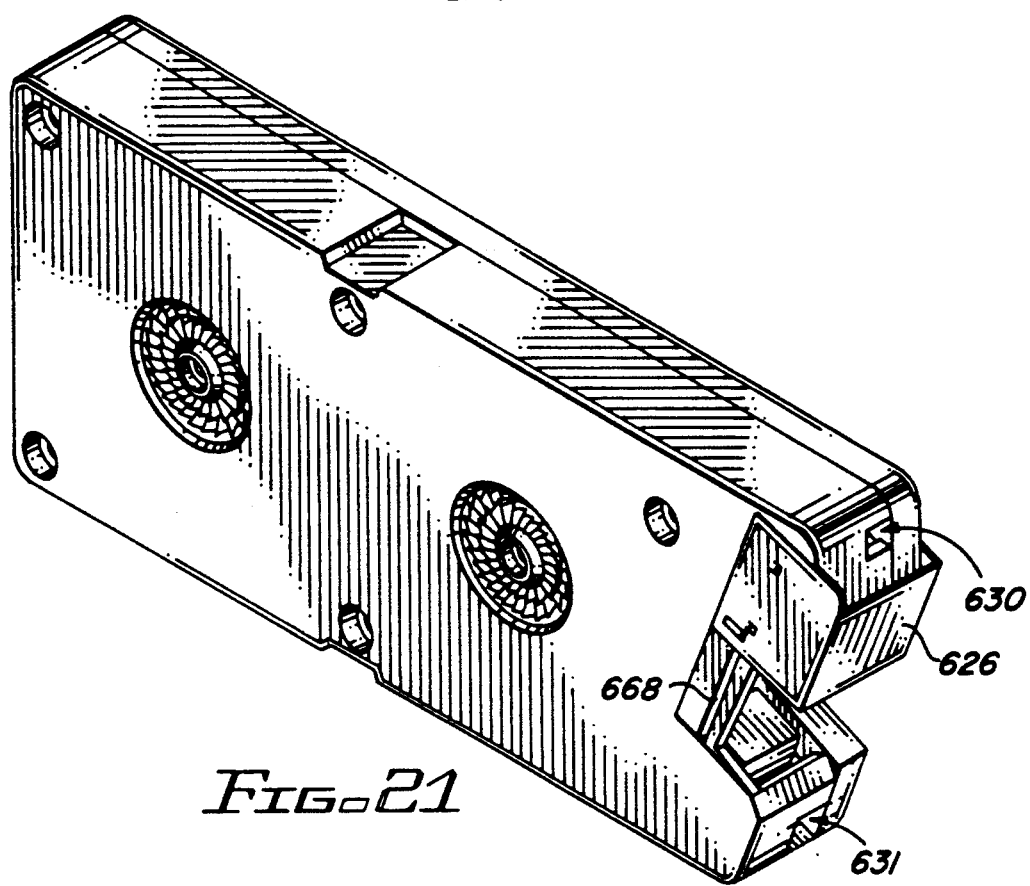
FIG. 21 is an isometric view of the tape cartridge with a sliding access door open.
Figure 22:
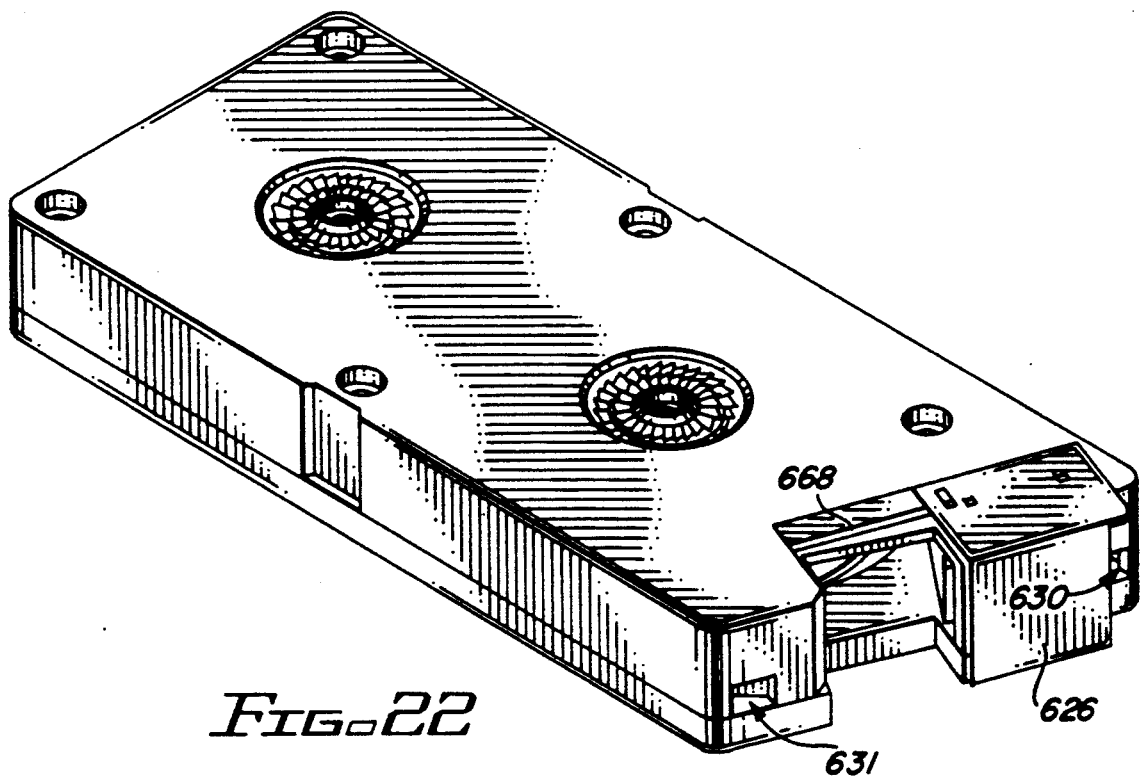
FIG. 22 is an isometric view of the tape cartridge with a sliding access door open from an alternate perspective.

Referring to FIGS. 12-13, pneumatic tape guide assembly 100 will now be described. Assembly 100 includes aforementioned bearings 105 and 125, including plenums 110 and 130 and compliant members 120 and 140 respectively. A gas entrance 150 is provided for mating with gas port 414 through hole 61. Gas entrance 150 includes an interior Y-shaped path to direct gas entering the tape cartridge through two tubes 124 and 144 and into openings in plenums 110 and 130, respectively. Gas entrance 150 also includes an opening 152 through which a screw 151 is inserted to threadably attach assembly 100 to hole 59 of mount plate 12.

A first thin bearing foil 160 is secured to plenum 110 and a second thin bearing foil 180 is secured to plenum 130. Foils 160 and 180 include small perforations or holes therethrough (such holes are not shown in other figures for convenience). Foils 160 and 180 are secured to plenums 110 and 130 by two solid, die-cut adhesives 161 and 181, respectively. Die-cut adhesive 161 has an opening 162 therein which matches an opening 163 in plenum 110 to seal the gas path between plenum 110 and foil 160. Die-cut adhesive 181 has an opening 182 therein which matches an opening 183 in plenum 130 to seal the gas path between plenum 130 and foil 180. Compressed gas entering into plenums 110 and 130 is thus forced through such openings and exits out of the small holes in foils 160 and 180, respectively.

Compliant members 120 and 140 include guide elements for laterally guiding the tape as it rides on the pneumatic, hydrostatic gas bearing. Foils 160 and 180 include recesses to permit the guide elements to laterally position the tape, yet ensure that the tape is fully supported across its width throughout the remainder of the foils arc of curvature.

Full support is achieved by employing a tape which is wider than the foils at the recesses, yet narrower than the foils away from the recesses. The width of the foils at the recesses is represented by an arrow 190; the width of the foils away from the recesses is represented by an arrow 191. Such full support allows for the use of very thin tape, yet prevents tape vibration disruptive to the head-tape interface because the tape cannot fold over the edge of the bearing surface. Two guide elements 121 and 122 fit within two recesses 126 and 127, respectively. Two guide elements 141 and 142 fit within two recesses 146 and 147, respectively.

Figure 14:
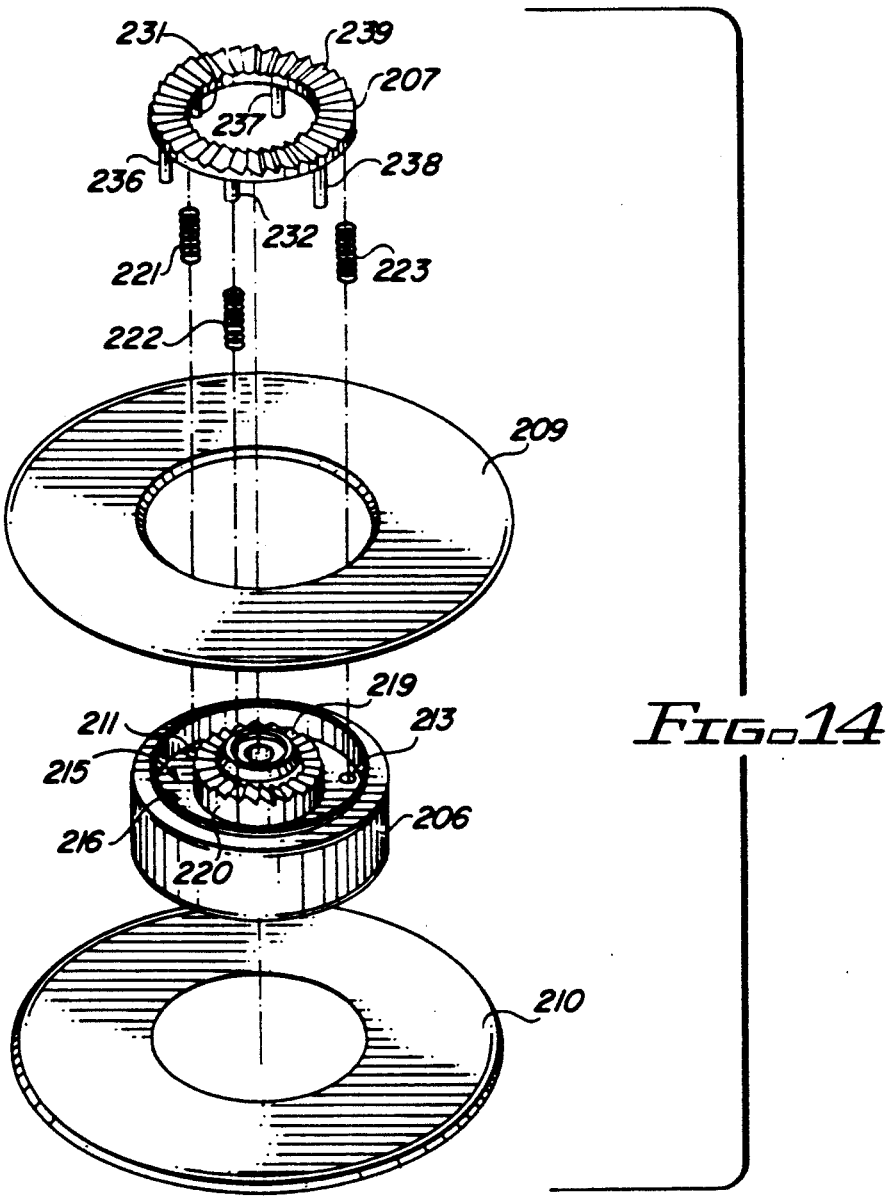
FIG. 14 is an exploded, isometric view of a toothed hub tape reel of the tape cartridge according to the invention.

Referring to FIG. 14, a toothed hub tape reel of the tape cartridge will now be described. Tape reel 200 is shown, but is also representative of the structure used in tape reel 300. Hub 206 is flanked by reel flanges 209 and 210 and includes a set of circularly configured teeth 219 on a relatively small diameter portion 220. Circular brake 207 includes a set of circularly configured teeth 239, three long mounting pins 236-238, and three short mounting pins. Of the three short mounting pins, only pins 231 and 232 are visible in FIG. 14. The long mounting pins and short mounting pins are alternately spaced around the circular configuration of brake 207.

A circular well 215 in the top of hub 206 includes portion 220 and a base having six holes therein. The holes are spaced around the circular configuration of well 215. Of the six holes, only holes 211, 213 and 216 are visible in FIG. 14. The three short mounting pins insert through three springs 221-223, respectively, and into three of the holes in circular well 215. For example, mounting pin 231 inserts into hole 211. The three long mounting pins 236-238 insert into three holes, respectively, in circular well 215. For example, mounting pin 236 inserts into hole 216.

The aforementioned mounting of the pins results in hub 206 and brake 207 being in a locked rotational relationship. Springs 221-223 bias brake 207 toward cover 14. Normally, when tape cartridge 10 is removed from a tape drive, the action of the teeth of brake 207 against a tab 214 (shown in FIGS. 15 and 16) of cover 14 prevents rotation of reel 200. In addition, the contact between brake 207 and cover 14 prevent dust, wear particles and other contaminants from entering the interior of tape cartridge 10.

To rotate reel 200 about axle 72, clutch face 416 (not shown in FIG. 14) is brought into engagement with the teeth of hub 206 and brake 207 to depress the teeth of brake 207 into well 215 against the bias of springs 221-223. The clutch is then free to rotate reel 200 by rotatably driving hub 206. When the clutch face is disengaged from reel 200, the biasing action of springs 221-223 result in braking of the rotation of reel 200 and seals the interior of tape cartridge 10 from contaminants by bringing brake 207 into contact with cover 14. Teeth 219 permit hub 206 to be driven directly by clutch face 416, unlike the alternate embodiments described later herein. Such direct driving eliminates the additional wear and tolerances associated with the driving arrangements of the alternate embodiments.

Referring to FIGS. 15-16, the toothed hub tape reels will be described as engaged with and disengaged from the clutch faces. Clutch face 416 is shown disengaged from hub 206; clutch face 418 is shown engaged with hub 306. Such an orientation of the clutch faces is shown for the convenience of illustration, in operation the clutch faces would generally engage and disengage simultaneously. Because only clutch face 418 is shown engaged, pins 331 and 338 are shown resting deeper in their respective circular well holes than pins 231 and 238. Similarly, spring 321 is compressed relative to spring 221. As a result, teeth 339 are disengaged from a tab 314 of cover 14 and teeth 239 are engaged with a tab 214 of cover 14.

Note that the lateral position of hub 206 between mount plate 12 and cover 14 is never altered because hub 206 is always biased against mount plate 12 by springs 221-223 or clutch face 416. Such a fixed position allows for a permanent, precise registration of reel 200 to mount surface 52 of mount plate 12 and the remainder of tape cartridge 10. The fixed position also allows for a narrow, compact tape cartridge. The tape can thus be guided at tolerances not previously achievable, resulting in improved tape path performance. When the fixed registration of reel 200 to mount plate 12 is combined with the precise registration of assembly 100 to mount surface 51 of mount plate 12 and the precise registration of tape head 402 to the tape, tape path performance is further enhanced.

Referring to FIG. 17, pivoting access door 26 will now be described. As shown, upper flange 27 has been removed to reveal pseudo-head 29 and an anchor 75. Flanges 27 and 28 permit access door 26 to close the openings in three walls of tape cartridge 10 which comprise head opening 25. The three openings are required to permit mating of tape head 402, which is wider than tape cartridge 10, to tape 1. The flanges also protect pseudo-head 29 from damage should access door 26 be opened when tape cartridge 10 is outside of a tape drive. Anchor 75 secures pseudo-head 29 to the remaining body of access door 26 by interference fit. In the alternative, pseudo-head 29 may be secured to the remainder of access door 26 with a suitable adhesive.

To insert tape cartridge 10 into the tape drive, access door 26 is pivoted to the open position and the cartridge is seated in mount 400 with head 402 mated with the tape. Clutch faces 416 and 418 are then brought into engagement with hubs 206 and 306. To remove tape cartridge 10 from the tape drive, clutch faces 416 and 418 are first disengaged from hubs 206 and 306 and the tape cartridge is withdrawn from mount 400, allowing access door 26 to be pivoted to the closed position by spring 69. As previously described, the disengagement of the clutch faces locks the rotational position of tape reels 200 and 300. The closing of access door 26 causes pseudo-head 29 to occupy the space normally occupied by the tape head when the tape cartridge is seated in mount 400. Such replacement eliminates slack in the tape otherwise present when the tape head separates from the tape, thereby maintaining constant tape tension. Pseudo-head 29 may actually insert slightly further into the tape path than tape head 402 to eliminate additional slack resulting from the position of brake 207 at brake engagement. In addition, the presence of pseudo-head 29 prevents the tape from being drawn taut straight between bearings 105 and 125. Such a condition could result in stretching of the tape as the tape head is again mated with the tape during re-insertion of tape cartridge 10 into the tape drive.

MANUFACTURE

The manufacture of tape cartridge 10 will now be described. Gas entrance 150, tubes 124 and 144, and plenums 110 and 130 are molded from a plastic such as polycarbonate, which may be glass-filled to increase its hardness and/or rigidity. Adhesive sheets 161 and 181 are die-cut from a solid sheet of polyamide. Openings 162 and 182 are die-cut to have a shape which matches that of (but slightly larger than) openings 163 and 183, respectively. Foils 160 and 180 are 2-4 mils thick polished brass or stainless steel foil which is lithographically etched to create the holes and edge recesses. Such materials and thickness are required to minimize cost while providing a foil of sufficient malleability that it can be successfully and permanently bonded to the curved surfaces of the plenums. The underside of the foils are roughened by oxidation or etching with ferric chloride/nitric acid to improve bonding to the plenums. The foil is protected by coating with a solution of a silane coupling agent (0.5%) or methanol in deionized water. The solution is applied by dipping, spraying, or wiping. After curing, the foils are coated with photoresist, patterned, and etched to create the airholes and recesses therein.

The plenums, adhesives, and foils are aligned in a fixture and heated under pressure to set the adhesive. Compliant members 120 and 140 are etched stainless steel. The gas entrance, tubes, plenums, foils and compliant members are then assembled using the screws shown in the figures and suitable adhesives to create the pneumatic tape guide assembly. The use of polished metal foils applied to a plastic plenum allows for a smooth, precisely shaped tape path at low cost.

Hubs 206 and 306, brakes 207 and 307, and the flanges of the tape reels are molded plastic, such as polycarbonate, which may again be glass-filled. The flanges are attached to each hub using a suitable adhesive or ultrasonic welding and the brakes are mated therewith. Mount plate 12 is a piece of solid (i.e. not hollow) metal stock, such as stainless steel or anodized aluminum, which is machined to create the various surfaces thereon, including mount surfaces 51-53 in the same plane. It is important that mount surfaces 51-53 be formed simultaneously (in a single machining operation) to ensure that they are all in the same plane to within the tightest possible tolerance. Both sides of mount plate 12 are machined to prevent warpage from residual stresses otherwise present after the machining of a single side. Solid metal is used to ensure that mount plate 12 holds its dimensional tolerances over time. After all of the holes are drilled in mount plate 12, the mount plate is tumbled to round the hole and surface edges and thereby prevent tape edge damage from contact therewith.

The pivoting access door is manufactured from a molded plastic, such as polycarbonate (which may again be glass-filled), with a flexible, low density polyethylene pseudo-head. The flexibility of the pseudo-head allows for better control of tape tension. Because mount 400 is aligned to mount plate 10, the remaining parts of tape cartridge 10 (except for foils 160 and 180) may be plastic, thereby achieving high performance at reduced cost. Tape 1 may be any known tape, such as magnetic or optical audio, video, or data storage tape. The active recording layer may be any known, such as chromium dioxide or metal particle magnetic layers. Tape 1 may be of any width, such as ¼ inch, ½ inch or 8mm.

To assemble tape cartridge 10, tape 1 is wound entirely upon one tape reel. The pneumatic tape guide assembly, both tape reels, and pivoting access door are mated with the mount plate using the axles, pins and screws shown in the figures and suitable adhesive, and tape 1 is threaded through the tape portion to the other tape reel. Cover 14 is then attached to the mount plate with screws to complete the tape cartridge 10. Base 401 and the reference stops of mount 400 are manufactured from similar hard, durable materials such as brass, stainless steel, and polycarbonate.

ALTERNATE EMBODIMENTS

Referring to FIG. 18, an alternate embodiment of the tape cartridge is shown. Tape cartridge 10 is unchanged except that pneumatic tape guide assembly 100 is eliminated and replaced with two non-pneumatic tape guides. Two plastic nearly D shaped bearings 510 and 530 replace bearings 105 and 125, respectively. Bearings 510 and 530 have solid tape bearing surfaces. Because a gas source is no longer used, gas entrance 150, tubes 124 and 144, die-cut adhesive 161 and 181, and bearing foils 160 and 180 are eliminated. To provide a smooth finish to the surfaces of bearing 510 and 530, such surfaces may be plated with thin layers of metal or covered with metal foils. Such metal foils are identical to foils 160 and 180, except that the holes therein are eliminated, and that adhesives 161 and 182 no longer need to be die-cut prior to bonding. In addition, hole 61 is eliminated from mount surface 51 and gas port 414 is eliminated from the accompanying tape cartridge mount. The the complaint guides are fitted within recesses molded into the edge of bearings 510 and 530, and the edges of any plated metal or metal foil.

Referring to FIGS. 19-23, another alternate embodiment of the tape cartridge is shown. Tape cartridge 10 is unchanged except that pivoting access door 26 is eliminated (as are its associated mounting hardware) and replaced with a sliding access door 626 having two flanges 627 and 628. Access door 626 is slidably guided by a groove 668 and a similar groove on the reverse side of tape cartridge 19 (not shown). Access door 626 is biased toward the closed position by a spring 669. The shape and location of the side recesses and mount portions are adjusted to accommodate the change from pivoting access door 26 to sliding access door 626. Thus, the two side recesses are now represented by numerals 630 and 631, and the two mount portions are now represented by numerals 632 and 633. A corresponding change is also required to the location of the cartridge guides on mount plate 401 (not shown).

Referring to FIG. 24, sliding access door 626 will now be described. As shown, upper flange 627 has been removed to reveal pseudo-head 629. Access door 626 is slidably retained upon tape cartridge 10 by two tabs 686 and 687 on flange 628, and similar tabs on flange 627, which protrude into and follow the aforementioned grooves. Access door 626 is shown in the closed position. In the open position, pseudo-head 629 is pressed flat against the base of access door 626 by the edge of the cover.

Figure 25:
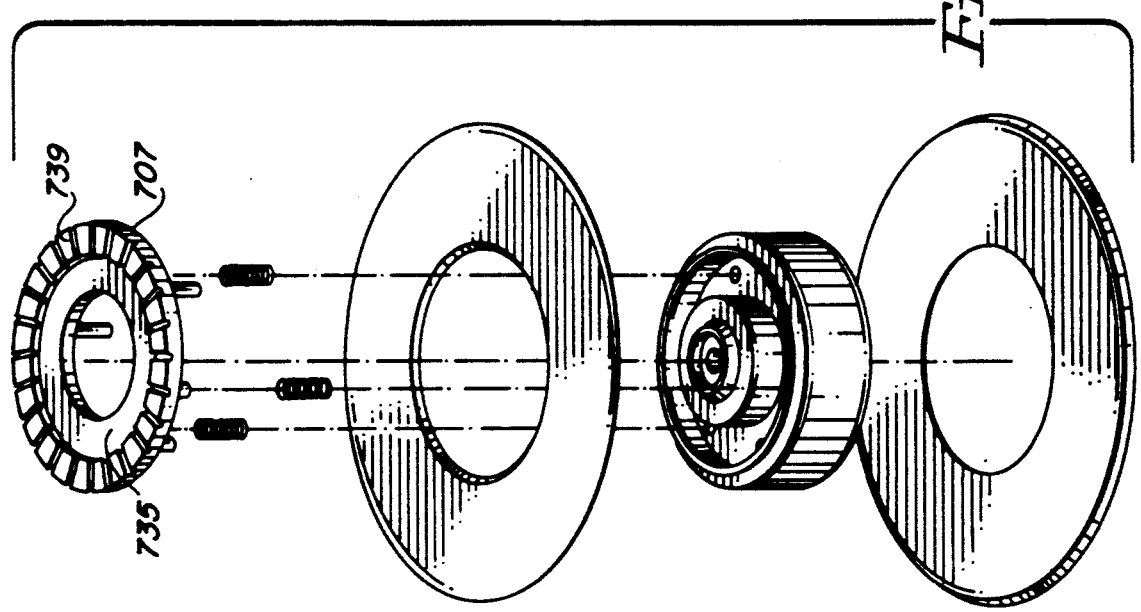
FIG. 25 is an exploded, isometric view of an alternate tape reel.

Referring to FIGS. 25-27, an alternate embodiment of the tape reels is shown. Tape reel 200 is unchanged except that brake 207 is eliminated and replaced with a circular brake 707. Brake 707 includes teeth 739 and a vertically recessed circular drive ring 735. The clutch faces are altered to mate with the new shape of the upper surfaces of the hub and drive ring 735, but do not mate with teeth 739. In addition, tabs 214 and 314 are eliminated and replaced with a tab which mates with teeth 739, such as a tab 714. The teeth are eliminated from the relatively small diameter portion of the hub. The surface of drive ring 735 is roughened to provide enough friction between it and the clutch face to allow it to be driven thereby. If necessary, teeth may also be included on drive ring 735 and the hub to provide for better mating.

Figure 28:
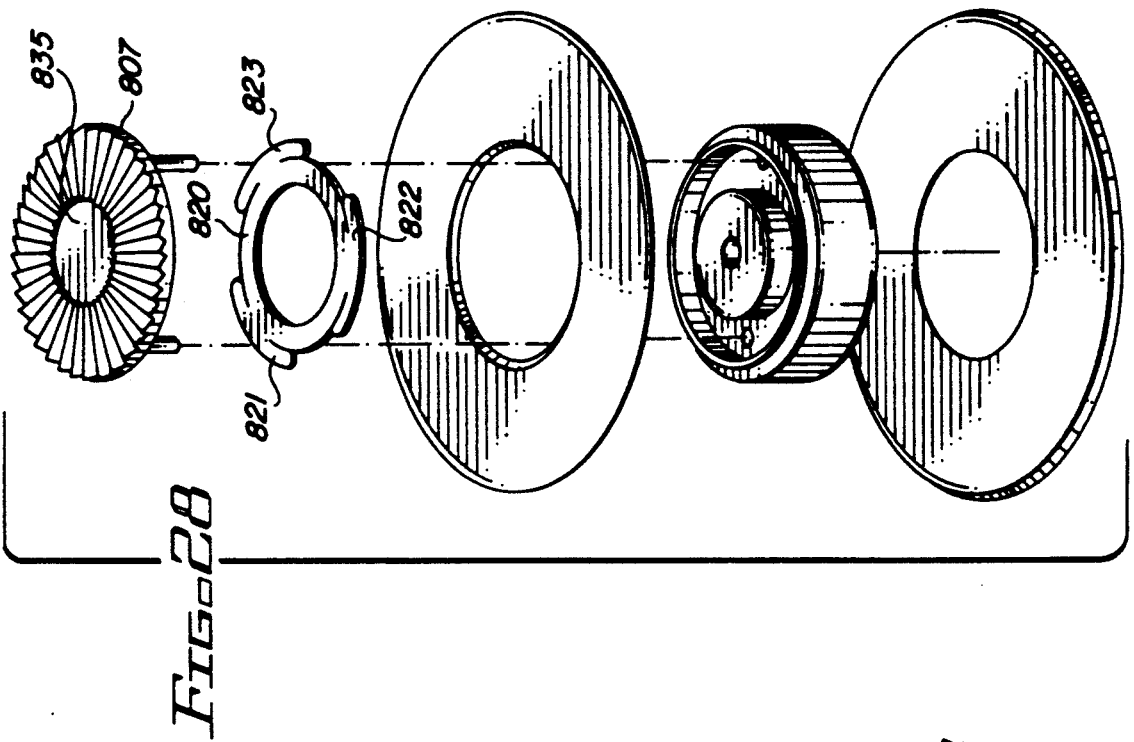
FIG. 28 is an exploded, isometric view of another alternate tape reel.
Figure 29:
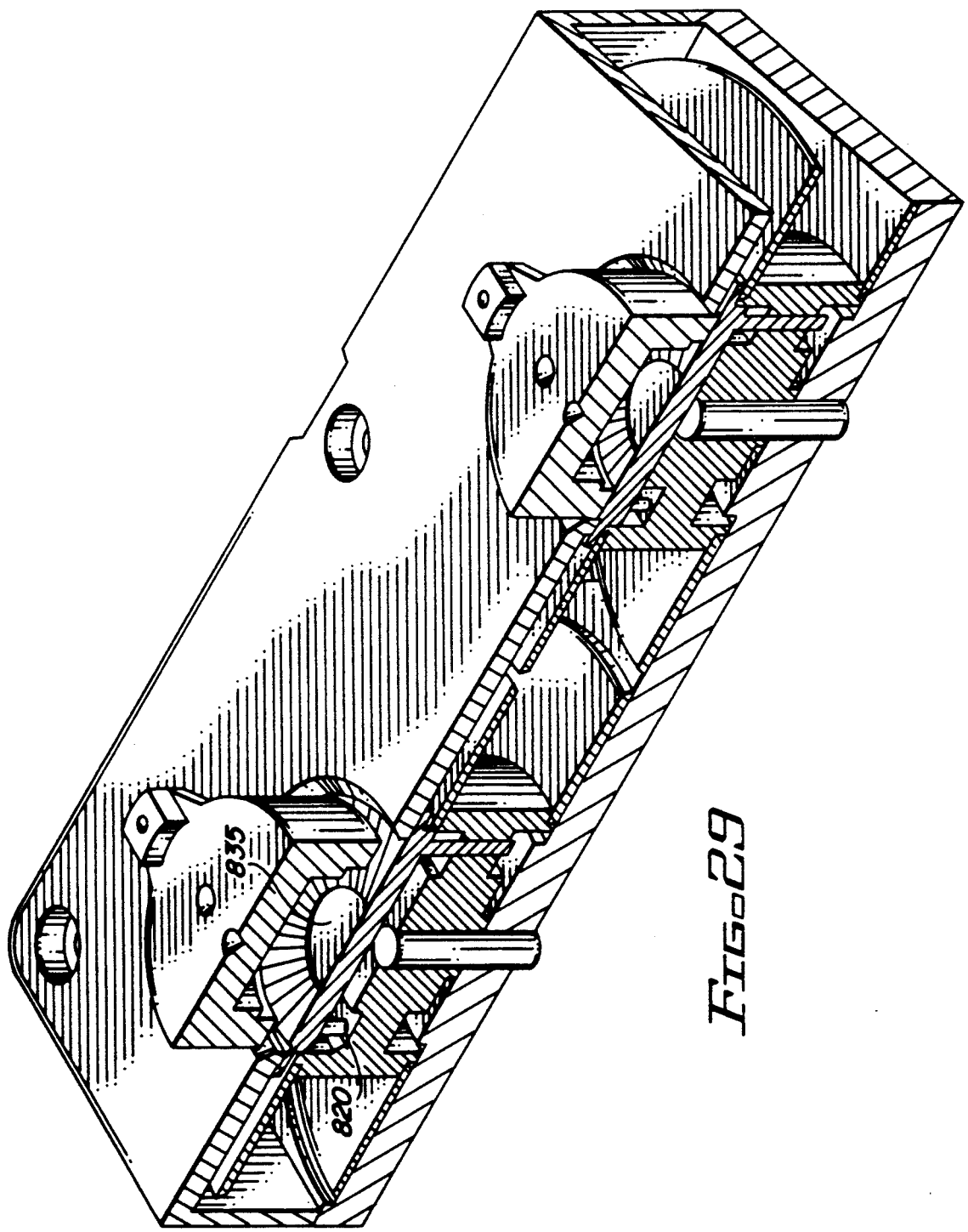
FIG. 29 is an isometric view of a portion of the tape cartridge with another alternate tape reel and sectioned vertically at line AA, except for the hub axles.

Referring to FIGS. 28-30, another alternate embodiment of the tape reels is shown. Tape reel 200 is unchanged from FIGS. 25-27 except that brake 707 is eliminated and replaced with a circular brake 807. Brake 807 includes a solid drive disk 835 (there is no opening in the center of the teeth) which may raise above the teeth. The height of the relatively small portion of the hub is reduced to allow clearance for disk 835. Disk 835 eliminates the seam that otherwise exists between the relatively small diameter portion of the hub and the drive ring, thereby improving shielding against contaminants. Springs 221-223 are also eliminated and replaced with a finger spring washer 820 (shown exaggerated in FIGS. 29 and 30). Washer 820 includes three sets of finger springs 821-823. The three short mounting pins are thus eliminated from the brake, and three holes are eliminated from the hub well.

While the invention has been described with respect to a preferred embodiment thereof, it will be understood by those skilled in the art that various changes in detail may be made therein without departing from the spirit, scope, and teaching of the invention. For example, a tape cartridge could be manufactured to include any combination of the alternate embodiments described. In addition, certain features described herein could be embodied in a single reel tape cartridge (e.g. tape reel 200)or in a tape drive (e.g. a tape guide with recesses 126 and 127). Accordingly, the invention disclosed herein is to be limited only as specified in the follow claims.

What is claimed is:

1. A tape cartridge comprising:
    a plate having a side with a first surface, a second surface, and a third surface thereon, the first surface, the second surface, and the third surface in a single plane and separated from each other by at least one recess in the side of the plate, the third surface including an edge and a portion interior of the edge;
    a first tape reel on the first surface;
    a second tape reel on the second surface;
    a tape having a first end wound upon the first tape reel and a second end wound upon the second tape reel; and
    a cover affixed to the plate to form a box-like housing about the first tape reel and the second tape reel, the housing having an inside and an outside, the majority of the side of the plate on the inside of the housing, the cover having a plurality of walls adjacent the plate, one of the walls having a recess therein exposing the portion of the third surface interior of the edge to the outside of the housing.

2. The tape cartridge of claim 1 wherein one of the walls has a plurality of recesses therein each exposing a portion of the third surface to the outside of the housing.

3. The tape cartridge of claim 1 wherein two of the walls each have a recess therein exposing a portion of the third surface to the outside of the housing.

4. The tape cartridge of claim 1 further comprising a first tape guide affixed to the third surface on the inside of the housing.

5. The tape cartridge of claim 4 further comprising a second tape guide affixed to the third surface on the inside of the housing.

6. The tape cartridge of claim 1 wherein the plate is anodized aluminum.

7. The tape cartridge of claim 6 wherein the first surface, the second surface, and the third surface are formed in a single plane by simultaneous machining.

8. The tape cartridge of claim 1 wherein the plate is stainless steel.

9. The tape cartridge of claim 8 wherein the first surface, the second surface, and the third surface are formed in a single plane by simultaneous machining.

10. The tape cartridge of claim 1 wherein the first and second tape reels each include a reel flange in said at least one recess, the reel flange having a tape edge guiding surface in the plane.

11. The tape cartridge of claim 10 wherein the third surface is a tape edge guiding surface.

12. A tape cartridge comprising:
    a solid metal plate having aside with a first surface, a second surface, and a third surface thereon, the first surface, the second surface, and the third surface formed in a single plane and separated from each other by at least one recess in the side of the plate, the third surface including an edge and a portion interior of the edge;
    a first tape reel on the first surface;
    a second tape reel on the second surface;
    a tape having a first end would upon the first tape reel and a second wound upon the second tape reel;
    a plurality of tape guides affixed to the third surface; and
    a cover affixed to the plate to form a box-like housing about the first tape reel, the second tape reel, and the tape guides, the housing having an inside and an outside, the majority of the side of the plate on the inside of the housing, the cover having a plurality of walls adjacent the plate, one of the walls having a recess therein exposing the portion of the third surface interior of the edge to the outside of the housing.

13. The tape cartridge of claim 12 wherein one of the walls has a plurality of recesses therein each exposing a portion of the third surface to the outside of the housing.

14. The tape cartridge of claim 12 wherein two of the walls each have a recess therein exposing a portion of the third surface to the outside of the housing.

15. The tape cartridge of claim 12 wherein the plate is stainless steel.

16. The tape cartridge of claim 12 wherein the plate is anodized aluminum.

17. The tape cartridge of claim 12 wherein the first and second tape reels each include a reel flange in said at least one recess, the reel flange having a tape edge guiding surface in the plane.

18. The tape cartridge of claim 17 wherein the first and second tape reels each include a reel flange in said at least one recess, the reel flange having a tape edge guiding surface in the plane.

19. A tape drive and a tape cartridge suitable for use in the tape drive, the tape cartridge comprising:
    a plate having a side with a first surface, a second surface, and a third surface thereon, the first surface, the second surface, and the third surface in a single plane and separated from each other by at least one recess in the side of the plate, the third surface including an edge and a portion interior of the edge;
    a first tape reel on the first surface;
    a second tape reel on the second surface;
    a tape having a first end wound upon the first tape reel and a second end wound upon the second tape reel; and
    a cover attached to the plate to form a box-like housing about the first tape reel and the second tape reel, the housing having an inside and an outside, the majority of the side of the plate on the inside of the housing, the cover having a plurality of walls adjacent the plate, one of the walls having a recess therein exposing the portion of the third surface interior of the edge to the outside of the housing; the tape drive comprising:
a mount suitable for seating the tape cartridge thereon, the mount including a fourth surface;
a tape head affixed to the mount; and
a mount guide affixed to the mount such that a portion of the plate rests between the mount guide and the fourth surface when the tape cartridge is seated in the mount, the mount guide inserted into the recess and against the third surface.

20. The tape drive and tape cartridge of claim 19 further comprising an access door affixed between the plate and the cover to pivot between an open position and a closed position, the open position exposing the tape to the tape head and creating clearance to the recess for the mount guide.

21. The tape drive and tape cartridge of claim 19 wherein one of the walls has a plurality of recesses therein each exposing a portion of the third surface to the outside of the housing.

22. The tape drive and tape cartridge of claim 19 wherein two of the walls each have a recess therein exposing a portion of the third surface to the outside of the housing.

23. The tape drive and tape cartridge of claim 19 further comprising a plurality of tape guides affixed to the third surface on the inside of the housing.

24. The tape drive and tape cartridge of claim 19 wherein the plate is anodized aluminum.

25. The tape drive and tape cartridge of claim 24 wherein the first surface, the second surface, and the third surface are formed in a single plane by simultaneous machining.

26. The tape drive and tape cartridge of claim 19 wherein the plate is stainless steel.

27. The tape drive and tape cartridge of claim 26 wherein the first surface, the second surface, and the third surface are formed in a single plane by simultaneous machining.

28. The tape cartridge of claim 19 wherein the first and second tape reels each include a reel flange in said at least one recess, the reel flange having a tape edge guiding surface in the plane.

29. The tape cartridge of claim 28 wherein the first and second tape reels each include a reel flange in said at least one recess, the reel flange having a tape edge guiding surface in the plane.

* * * * *